United States Patent
Kluesing et al.

(10) Patent No.: US 7,359,452 B2
(45) Date of Patent: Apr. 15, 2008

(54) SYSTEMS AND METHODS FOR DESIGNING A HIGH-PRECISION NARROWBAND DIGITAL FILTER FOR USE IN A COMMUNICATIONS SYSTEM WITH HIGH SPECTRAL EFFICIENCY

(75) Inventors: Alvin Dale Kluesing, San Jose, CA (US); Sai C. Manapragada, San Jose, CA (US)

(73) Assignee: Photron Research and Development PTE Ltd., Singapore (SG)

( * ) Notice: Subject to any disclaimer, the term of this patent is extended or adjusted under 35 U.S.C. 154(b) by 0 days.

(21) Appl. No.: 11/900,249

(22) Filed: Sep. 10, 2007

(65) Prior Publication Data

US 2008/0002784 A1   Jan. 3, 2008

Related U.S. Application Data

(63) Continuation of application No. 11/171,592, filed on Jun. 29, 2005, now Pat. No. 7,269,230.

(60) Provisional application No. 60/626,212, filed on Nov. 8, 2004.

(51) Int. Cl.
*H04L 27/00* (2006.01)
*H04L 27/20* (2006.01)
*H04L 23/00* (2006.01)

(52) U.S. Cl. .................. 375/295; 375/308; 375/377

(58) Field of Classification Search .............. 375/259, 375/295, 377, 279, 280, 308; 455/91; 332/103
See application file for complete search history.

(56) References Cited

U.S. PATENT DOCUMENTS

| | | | | |
|---|---|---|---|---|
| 4,747,160 | A * | 5/1988 | Bossard | 455/422.1 |
| 4,870,489 | A * | 9/1989 | Ducret | 348/458 |
| 5,930,303 | A * | 7/1999 | Walker | 375/301 |
| 6,445,373 | B1 * | 9/2002 | Yamamoto | 345/102 |
| 6,606,010 | B1 * | 8/2003 | Poklemba et al. | 332/103 |
| 6,748,022 | B1 * | 6/2004 | Walker | 375/289 |
| 7,190,737 | B2 * | 3/2007 | Okamoto | 375/286 |

* cited by examiner

*Primary Examiner*—Tesfaldet Bocure
(74) *Attorney, Agent, or Firm*—Morgan, Lewis & Bockius LLP

(57) ABSTRACT

Systems and methods for transmitting information at very high data rates through narrowband communication channels are provided. The systems and methods involve modulating a message signal with a novel return-to-zero, abrupt phase modulation technique and filtering the modulated signal with a sophisticated high-precision digital filter. The digital filter is designed based on fractal modeling of the frequency spectrum of the modulated signal. The systems and methods of the present invention enable data rates exceeding 5 Mbps to be delivered through frequency channels as narrow as 50 KHz under a variety of channel conditions.

8 Claims, 27 Drawing Sheets

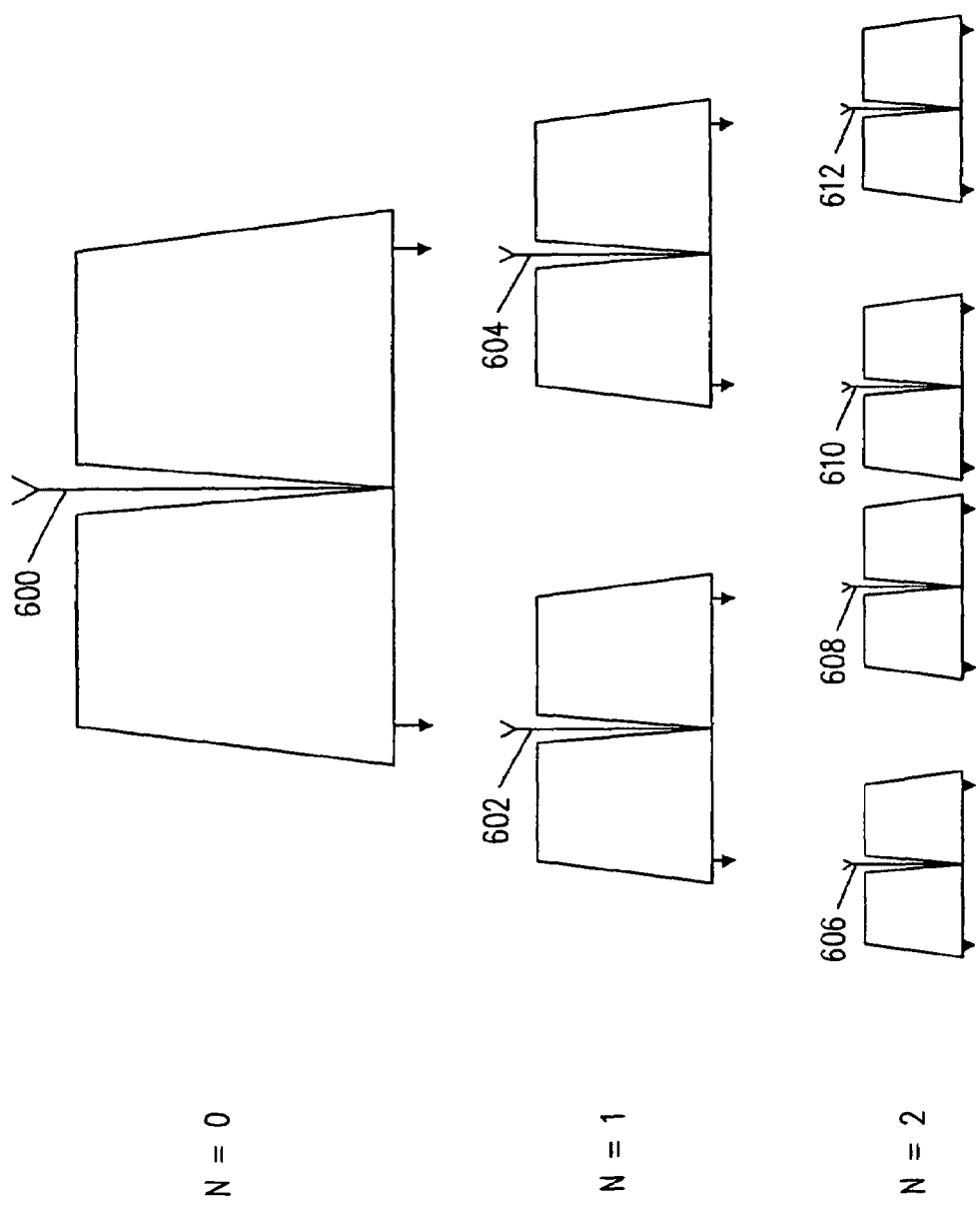

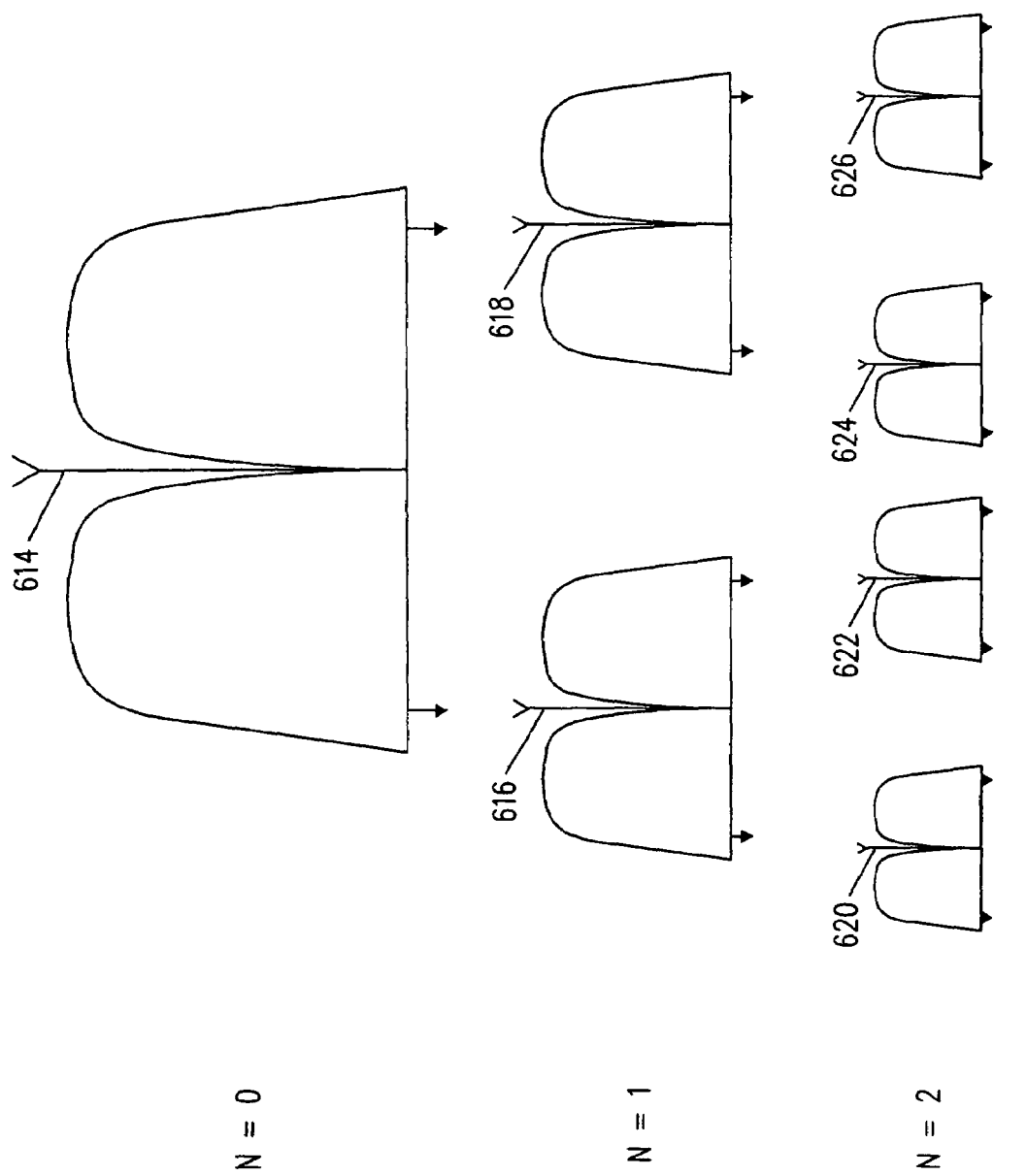

SYSTEMS AND METHODS FOR DESIGNING A HIGH-PRECISION NARROWBAND DIGITAL FILTER FOR USE IN A COMMUNICATIONS SYSTEM WITH HIGH SPECTRAL EFFICIENCY

CROSS REFERENCE TO RELATED APPLICATIONS

This is a Continuation patent application of U.S. Utility patent application Ser. No. 11/171,592 filed on Jun. 29, 2005, now issued as U.S. Pat. No. 7,269,230 on Sep. 11, 2007, which claims priority to U.S. Provisional Patent Application No. 60/626,212 entitled "USM (Generic, Symmetrical and Asymmetrical" filed on Nov. 8, 2004. This Continuation application is related to U.S. patent application Ser. No. 11/171,177 filed on Jun. 29, 2005, the entire disclosure of each of which is incorporated herein by reference.

FIELD OF THE INVENTION

This invention relates generally to the transmission of information through communication channels. More specifically, this invention provides systems and methods for transmitting information at very high data rates through narrowband communication channels using a novel modulation scheme and sophisticated high-precision digital filtering.

BACKGROUND OF THE INVENTION

Advances in communications technologies, combined with the widespread adoption of personal communication devices ("PCSs"), have revolutionized the way information is disseminated and shared. Information can now be delivered directly to computer desktops, laptops, personal digital assistants ("PDAs"), cellular telephones, digital music players, and other portable devices over wired or wireless connections, providing a virtually unlimited connection experience for all users. In particular, the rapid expansion of wireless technologies has fueled the demand for faster and more efficient wireless transmission of voice, data, and video on a global basis.

Information is transmitted over a wireless channel from an information source to a destination by means of a wireless communications system, such as the conventional system shown in FIG. 1. At its simplest form, wireless communications system 100 includes: (1) modulator 105; (2) transmitter 110; (3) wireless channel 115; (4) receiver 120; and (5) demodulator 125. Modulator 105 processes the information into a form suitable for transmission over wireless channel 115. The information may be in the form of voice, data, audio, imagery, video, or any other type of content conveyed in an information signal, also referred to as a message signal. Modulator 105 essentially translates the message signal into a modulated signal suitable for transmission over wireless channel 115 by modifying one or more characteristics of a carrier signal. The modulated signal is passed on to wireless channel 115 by transmitter 110, which usually filters and amplifies the modulated signal prior to its transmission. The function of wireless channel 115 is to provide a wireless link or connection between the information source and destination. Once transmitted through wireless channel 115, the modulated signal is detected and amplified by receiver 120 to take into account any signal attenuations introduced during transmission by wireless channel 115. Finally, the transmitted signal is demodulated by demodulator 125 so as to produce a close estimate of the original message signal.

The performance of a wireless communications system such as wireless communications system 100 is, in part, dictated by the performance of its modulator, e.g., modulator 105. For it is the modulator that is responsible for converting the message signal into a signal suitable for transmission so as to maximize the use of the overall system resources. For example, a high performance modulator should generate a modulated signal having a frequency spectrum that, when filtered and transmitted by a transmitter such as transmitter 110, would utilize only a small fraction of the total channel bandwidth, thereby enabling many users to share the channel bandwidth simultaneously. A high performance modulator should also work in conjunction with a high performance filter in the transmitter to ensure optimal preservation of the frequency spectrum of the modulated signal.

Current wireless communications systems use many different modulation techniques, including, but not limited to, amplitude shift keying ("ASK"), frequency shift keying ("FSK"), binary phase shift keying ("BPSK"), quadrature phase shift keying ("QPSK") and its variations, minimum shift keying ("MSK") and Gaussian minimum shift keying ("GMSK"), among others. These modulation techniques are digital techniques in which the message signal is represented by a sequence of binary symbols. Each symbol may have one or more bits, depending on the modulation technique used.

Typically, these modulation techniques switch or key the amplitude, frequency, and/or phase of a carrier signal according to the binary symbols in the message signal, e.g., according to binary symbols "0" and "1." For example, different amplitudes are used to represent both binary symbols in ASK, different frequencies are used to represent both binary symbols in FSK, and different phases are used to represent both binary symbols in BPSK. QPSK is a variation of BPSK in which two bits or more are used per symbol. The phase of the carrier takes on one of four equally spaced values, such as $0$, $\pi/2$, $\pi$, and $3\pi/2$, with each value corresponding to a unique symbol, e.g., 00, 10, 11, and 01. MSK and GMSK are variations of FSK in which the change in carrier frequency from one binary symbol to another is half the bit rate of the message signal.

The selection of a digital modulation technique for use in a wireless communications system depends on several factors. A desirable digital modulation technique provides low bit error rates at low signal-to-noise ratios, occupies a minimum bandwidth, performs well in the presence of multipath and fading conditions, and is cost-effective to implement. Depending on the physical characteristics of the channel, required levels of performance and target hardware trade-offs, some modulation techniques will prove to be a better fit than others. Consideration must be given to the required data rate, acceptable level of latency, available bandwidth, and target hardware cost, size, and power consumption. For example, in personal communication systems that serve a large subscriber community, the cost and complexity of the receivers must be minimized. In this case, a modulation technique that is simple to detect is most attractive. In cellular systems where intersymbol interference is a major issue, the performance of the modulation technique in an interference environment is extremely important.

The performance of a modulation technique is often measured in terms of its power efficiency and bandwidth efficiency. Power efficiency describes the ability of a modulation technique to preserve the fidelity, i.e., an acceptable bit error probability, of the message signal at low power levels. In digital communication systems, higher fidelity requires higher signal power. The amount by which the signal power should be increased to obtain a certain level of fidelity depends on the type of modulation employed. The power efficiency of a digital modulation technique is a measure of how favorably this tradeoff between fidelity and signal power is made, and is often expressed as the ratio of the signal energy per bit to noise power spectral density required at the receiver input for a certain probability of error.

Bandwidth efficiency describes the ability of a modulation technique to accommodate data within a limited bandwidth. In general, increasing the data rate implies decreasing the pulse-width of a digital symbol, which increases the bandwidth of the signal. Bandwidth efficiency reflects how efficiently the allocated bandwidth is utilized. Bandwidth efficiency is defined as the ratio of the throughput data rate per Hertz in a given bandwidth. The system capacity of a digital modulation technique is directly related to the bandwidth efficiency of the modulation technique, since a modulation technique having a greater bandwidth efficiency will transmit more data in a given spectrum allocation.

In general, modulation techniques trade bandwidth efficiency for power efficiency. For example, FSK is power efficient but not as bandwidth efficient and QPSK and GMSK are bandwidth efficient but not as power efficient. Since most wireless systems are bandwidth limited due to frequency spectrum allocations, modulation techniques that concentrate their performance on bandwidth efficiency are generally preferable. In fact, most wireless communication standards available today use more bandwidth-efficient modulation techniques such as QPSK and its variations, in use by the PHS and PDC Japanese standards, and IS-54 and IS-95 American standards, and GMSK, in use by the GSM global standard.

The bandwidth efficiencies achieved by the digital modulation techniques currently adopted by the wireless standards are, however, only in the order of 1-10 bps/Hz. Such bandwidth efficiencies are not able to satisfy the rapidly rising demand for faster and more efficient wireless services that are capable of serving a large number of users simultaneously.

To address these concerns, two new sets of modulation techniques have been developed: (1) spread spectrum modulation techniques; and (2) narrowband modulation techniques. Spread spectrum modulation is a technique in which the modulated signal bandwidth is significantly wider than the minimum required signal bandwidth. Bandwidth expansion is achieved by using a function that is independent of the message and known to the receiver. The function is a pseudo-noise ("PN") sequence or PN code, which is a binary sequence that appears random but can be reproduced in a deterministic manner by the receiver. Demodulation at the receiver is accomplished by cross-correlation of the received signal with a synchronously-generated replica of the wideband PN carrier.

Spread spectrum modulation has many features that make it particularly attractive for use in wireless systems. First and foremost, spread spectrum modulation enables many users to simultaneously use the same bandwidth without significantly interfering with one another. The use of PN codes allows the receiver to separate each user easily even though all users occupy the same spectrum. As a result, spread spectrum systems are very resistant to interference, which tends to affect only a small portion of the spectrum and can be easily removed through filtering without much loss of information. Additionally, spread spectrum systems perform well in the presence of multipath fading and Doppler spread.

The main disadvantage of spread spectrum systems is that they are very bandwidth inefficient for a single user or a single wireless cell, since the bandwidth utilized is much more than that necessary for transmission. In fact, bandwidth efficiency for a single user is so low that most spread spectrum systems report bandwidth efficiency for the whole channel, to emphasize their ability to simultaneously serve many users with the available channel bandwidth. In addition, spread spectrum systems are also much more complex than systems employing traditional modulation techniques, thereby increasing overall system design, deployment, and maintenance costs.

Narrowband modulation techniques, such as those described in U.S. Pat. No. 5,930,303, U.S. Pat. No. 6,748,022, and U.S. Pat. No. 6,445,737, provide an entirely different approach. Instead of spreading the signal over a wide bandwidth range to optimize the number of users sharing the channel bandwidth simultaneously, narrowband modulation techniques attempt to squeeze the frequency spectrum into a as narrow of a band as possible in order to maximize both the bandwidth efficiency for an individual user and the overall channel utilization for a large number of users. In the narrowband modulation techniques described therein, phase reversals occurring before, in the middle, at the end, or after a bit period are used to generate a modulated signal having most of its energy concentrated in a very narrow peak centered at a carrier frequency. As most of the signal energy is concentrated in the narrow peak, transmission of the modulated signal may be accomplished by transmission of the narrow peak, thereby significantly improving the bandwidth efficiency for an individual user.

While achieving bandwidth efficiencies of 30-60 bps/Hz, these narrowband modulation techniques are not very practical because they require the use of a specialized analog crystal filter with a resonant frequency tuned by a shunt capacitor. Such a filter is very difficult to implement in practice due to tuning imperfections of the shunt capacitor, irregularities of the crystal material employed, and other challenges associated with designing high-precision analog crystal filters. Furthermore, these narrowband modulation techniques are very susceptible to intersymbol interference, may not perform well under high bit error rates, and require higher transmission power than traditional modulation techniques such as FSK and BPSK.

Because currently-available modulation techniques have not been able to achieve high bandwidth and power efficiencies while performing well under various channel conditions, broadband wireless services that reach a large number of users simultaneously have not yet been fully deployed. Such services should be able to serve users with voice, data, audio, imagery, and video at high data rates and low infrastructure costs to service providers and consumers alike. Such services should also be able to optimize the number of users served by better utilization of the allocated frequency spectrum.

In view of the foregoing, there is a need in this art for a digital modulation technique that achieves very high bandwidth efficiency under various channel conditions.

There is a further need in this art for a high-precision narrowband digital filter for use in conjunction with a narrowband digital modulation technique in a communications system that achieves high bandwidth efficiency when transmitting information through narrowband communication channels.

There is also a need in this art for a communications system that optimizes bandwidth utilization when providing wireless services to a large number of users simultaneously under various channel conditions.

SUMMARY OF THE INVENTION

In view of the foregoing, a general object of the present invention is to provide a digital modulation technique that achieves very high bandwidth efficiency under various channel conditions.

In one aspect, the present invention provides a high-precision narrowband digital filter for use in conjunction with a narrowband digital modulation technique in a communications system that achieves high bandwidth efficiency when transmitting information through narrowband communication channels.

In another aspect, the present invention provides a communications system that optimizes bandwidth utilization when providing wireless services to a large number of users simultaneously under various channel conditions.

These and other aspects of the present invention are accomplished by providing communications systems and methods that are characterized by their bandwidth efficiency, high data rates and enhanced data capacity. The communications system and methods of the present invention employ a novel narrowband digital modulation technique in conjunction with a high-precision digital filter to achieve broadband-like services within a narrow frequency spectrum.

The novel narrowband digital modulation technique of the present invention, hereinafter referred to as Ultra Spectral Modulation ("USM") technique, comprises a return-to-zero modulation technique that uses abrupt phase changes to represent incoming binary symbols in a modulated signal, herein referred to as a "USM-modulated signal." In one embodiment, the abrupt phase changes occur mid-pulse, i.e., in the middle of a bit period, after an integer number of cycles of the carrier signal. In an exemplary embodiment, a binary symbol, e.g., "0" or "1", is represented with an integer number of cycles, e.g., n cycles, of a carrier signal, of which n/2 cycles are used at a given phase and the other n/2 cycles are used at a phase shift, with the abrupt phase shift occurring mid-pulse. In one embodiment, the USM-modulated signal has a double-sideband suppressed carrier ("DSSC") frequency spectrum with two wide spectrum sidebands and no carrier.

The USM technique represents all the information in the message signal with the abrupt phase shifts occurring in the USM-modulated signal. That is, all the information conveyed in the message signal may be recovered by knowing where the phase shifts occur or by preserving the positions of the phase shifts during transmission. As a result, transmission may be accomplished by transmitting only a narrow band of frequencies required for identifying the phase shifts, i.e., by transmitting only a portion of one or both sidebands in the USM-modulated signal within a narrow band of frequencies.

The present invention also provides a high-Q, low-tolerance sophisticated digital filter that is able to preserve the positions of the phase shifts in a very narrow band of frequencies. Filtering the USM-modulated signal with the digital filter designed according to the principles and embodiments of the present invention and described hereinbelow produces a filtered signal with a time response that accurately identifies where the abrupt phase shifts in the USM-modulated signal occur.

In a preferred embodiment, the digital filter may be designed by selecting a center frequency and a bandwidth based on unique fractal bifurcation patterns occurring on the frequency spectrum of a USM-modulated signal. The USM technique of the present invention produces a USM-modulated signal having a unique DSSC frequency spectrum that may be modeled with fractal bifurcation patterns or a set of fractal primitives.

In a preferred embodiment, the fractal bifurcation patterns are selected so as only a narrow band of frequencies need be transmitted. As a result, narrowband transmission of information may be accomplished since only a narrow band of frequencies of the message signal may be transmitted at any desired data rate. In one exemplary embodiment, the wireless communications systems and methods of the present invention are able to transmit 5 Mbps in a very narrow 50 KHz channel.

Transmission of a USM-modulated signal may be accomplished by two unique transmitter approaches: (1) a fractal-based transmitter filtering approach; and (2) a fractal-based look-up table transmitter approach. In the fractal-based transmitter filtering approach, the high-Q, low-tolerance digital filter is designed based on the selection of a fractal bifurcation index and a given data rate desired for transmission. The digital filter is used to filter the USM-modulated signal prior to transmission through a communications channel.

In the fractal-based table look-up approach, the USM-modulated signal is transmitted through use of a simple look-up table storing samples extracted from the fractal modeling of the frequency spectrum of the filtered USM-modulated signal and used to represent a binary symbol, e.g., a "0" or a "1." Transmission of a binary symbol is accomplished by simply encoding the symbol into its corresponding samples stored in the look-up table.

Accordingly, two unique receiver approaches may be used in conjunction with either one of the two unique transmitter approaches to recover the transmitted signal: (1) a fractal-based receiver filtering approach; and (2) a fractal-based spectral estimator receiver approach. In the fractal-based receiver filtering approach, a receiver filter designed according to the fractal bifurcation index and the desired transmission data rate is used to extract the transmitted signal. The clock is recovered and used to phase lock the receiver clock, which is then synchronized with the transmitted signal. A demodulator including a correlator, a phase detector, and a decision block is then used to recover the transmitted signal.

In the fractal-based spectral estimator receiver approach, a spectral estimator is used to recover the spectrum of the transmitted signal. A spectral selector is used to select the transmitted frequencies in the recovered spectrum. A demodulator including a correlator, a phase detector, and a decision block is then used to recover the transmitted signal.

The present invention also provides a unique transmitter/receiver polarization approach suitable for satellite communications. The satellite communications system makes use of horizontally polarized and vertically polarized antennas to transmit and detect USM-modulated signals. The satellite transmitter includes a signal generator for adapting a USM-modulated signal for transmission through the polarized antennas. The satellite receiver detects the transmitted signal by means of a spectral estimator or a fractal-based receiver filter, a reference phase lock loop, a spectral selector, and other receiver circuitry.

Advantageously, the communications systems and methods of the present invention enable data rates exceeding 5

Mbps to be delivered through frequency channels as narrow as 50 KHz under a variety of channel conditions. The communications system and methods of the present invention may operate as a standalone network or be integrated into existing wireless systems at very low overhead costs. In addition, the communications system and methods of the present invention enable wireless service providers to provide broadband wireless services to a large number of users simultaneously by accessing a fully-utilized frequency spectrum that may be divided into various channels of very narrow bandwidths.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIGS. 6A-B are exemplary diagrams of two sets of fractal primitives for modeling the frequency spectrum of a USM-modulated signal according to the principles and embodiments of the present invention;

DETAILED DESCRIPTION OF EMBODIMENTS OF THE INVENTION

Figure 1:
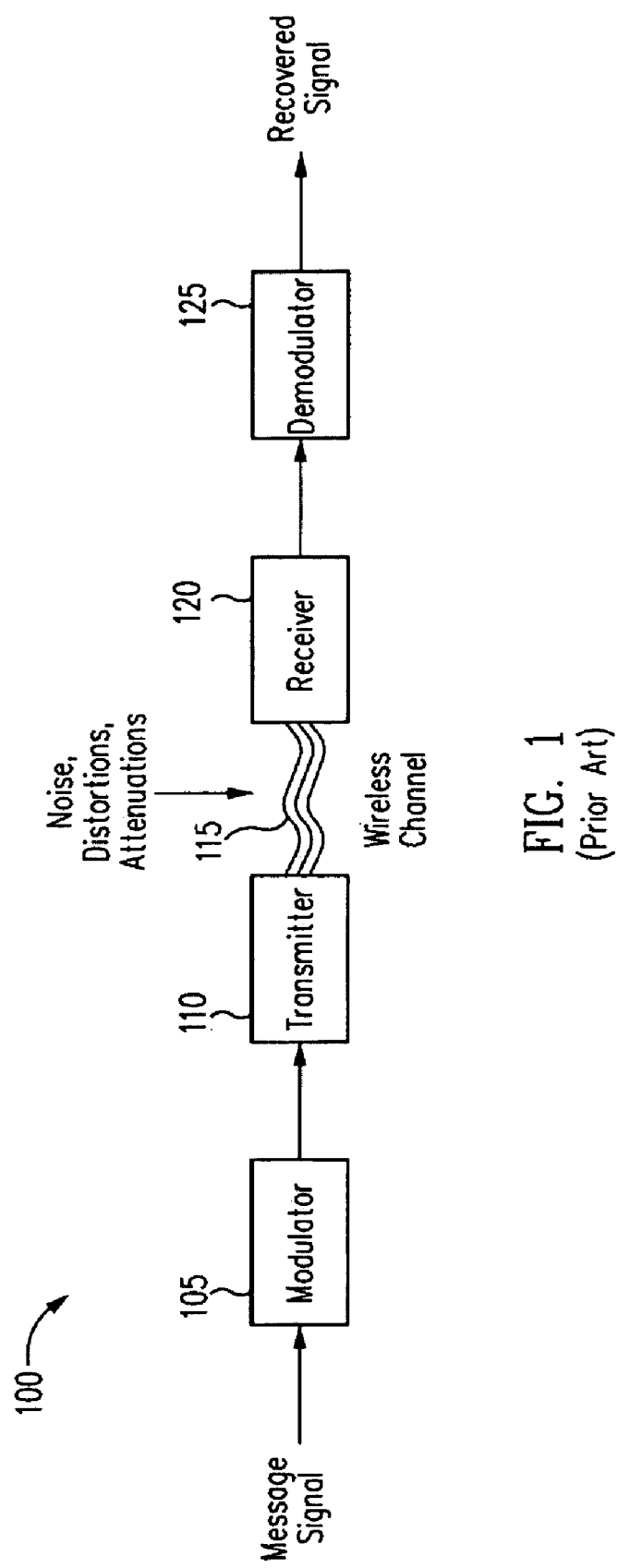
FIG. 1 is an exemplary schematic diagram of a conventional wireless communications system.

Generally, the present invention provides communication systems and methods for transmitting information through narrowband communication channels. Information, as used herein, may be in the form of voice, data, audio, imagery, video, or any other type of content conveyed in an information signal, also referred to as a message signal. The message signal represents information by means of binary symbols, with each symbol having one or more bits.

Message signals according to the present invention are modulated prior to transmission through a communications channel. A channel, as used herein, may be any communications channel, including a wired channel, e.g., cable, or a wireless channel. In general, modulation refers to the process by which information conveyed in the message signal is encoded in a carrier signal to generate a modulated signal. Typically, the encoding involves modifying one or more characteristics of the carrier signal according to the binary symbols in the message signal. A carrier signal may be any analog signal of a given frequency, for example, a sinusoidal wave at 100 KHz. A modulated signal, as used herein, refers to the carrier signal that has been modified according to the message signal.

The modulated signal has a frequency spectrum representation comprising its frequency components. Modulated signals according to the ultra spectrum modulation ("USM") technique of the present invention have frequency spectrums comprising no carrier and two bands or "sidebands" of frequencies, one above (the "upper sideband" or "USB") and one below (the "lower sideband" or "LSB") the carrier frequency. Transmission of one of the sidebands is referred to as single-sideband suppressed-carrier ("SSSC") transmission and transmission of both sidebands is referred to as double-sideband suppressed carrier ("DSSC") transmission.

Transmission of the modulated signal through a communications channel may first be accomplished by filtering the modulated signal to extract the necessary frequencies. Accordingly, the modulated signal may be filtered by an analog or digital filter. In one embodiment, the modulated signal is filtered by a linear-phase digital filter as described hereinbelow. A filter, as used herein, is any device, process, or algorithm for limiting the spectrum of a signal to a given band of frequencies. The band of frequencies is generally referred to as the bandwidth of the filter.

The bandwidth of the channel refers to the band of frequencies allocated for transmission of one or more modulated signals. For example, a channel having a bandwidth of 100 MHz supports the transmission of one or more modulated signals within a frequency spectrum of 100 MHz. If, for example, each modulated signal is filtered down to a bandwidth of 10 KHz, then the channel is able to support the transmission of 10,000 such signals. The amount of data that can be transferred in a channel having a given bandwidth is referred to as the channel's data rate and expressed in bits per second. The maximum data rate supported by a channel for a given bandwidth, noise level, and other channel assumptions is referred to as the channel capacity and given by the Shannon-Hatley theorem.

Aspects of the invention further provide for the fractal modeling of sidebands using fractal bifurcation patterns or fractal primitives. A fractal, as used herein, is a geometric object with a self-similar structure that occurs at different levels of magnification. A fractal can be generated by a repeating pattern, in a typically recursive or iterative process. The repeating pattern may be referred to as a fractal primitive, or simply, as a fractal bifurcation pattern. A fractal bifurcation pattern is a geometric object that may be bifurcated a number of times to generate smaller, self-similar patterns at different scales or levels of detail. The number of bifurcations is given by a fractal bifurcation index.

The present invention further provides for the design of a digital filter, transmitter and receiver based on fractal modeling of sidebands. A digital filter may be designed based on a fractal bifurcation index and a desired data rate as described hereinbelow to transmit a modulated signal modulated with the USM technique. The USM-modulated signal may also be transmitted by using a fractal-based look-up table, with entries generated according to the fractal modeling of the sidebands of a USM-modulated signal. Different alternative embodiments of receivers for demodulating the transmitted modulated signal and recovering the original message signal are also described hereinbelow. It will further be appreciated that as new and different modulation techniques, filter design approaches, and transmitter and receiver circuitry are developed such modulation techniques, filter design approaches, and transmitter and receiver circuitry may also be accommodated by the present invention.

I. Ultra Spectral Modulation

Ultra Spectral Modulation ("USM") comprises a return-to-zero modulation technique that uses abrupt phase changes in a carrier signal to represent incoming binary symbols. The abrupt phase changes occur mid-pulse, i.e., in the middle of a bit period, after an integer number of cycles of the carrier signal, or at a bit boundary. In an exemplary embodiment, a binary symbol, e.g., "0" or "1", is represented with an integer number of cycles, e.g., n cycles, of a carrier signal, of which n/2 cycles are used at a given phase and the other n/2 cycles are used at a phase shift, with the abrupt phase shift occurring mid-pulse. The modulated carrier signal is referred to herein as the "USM-modulated signal."

Figure 2:
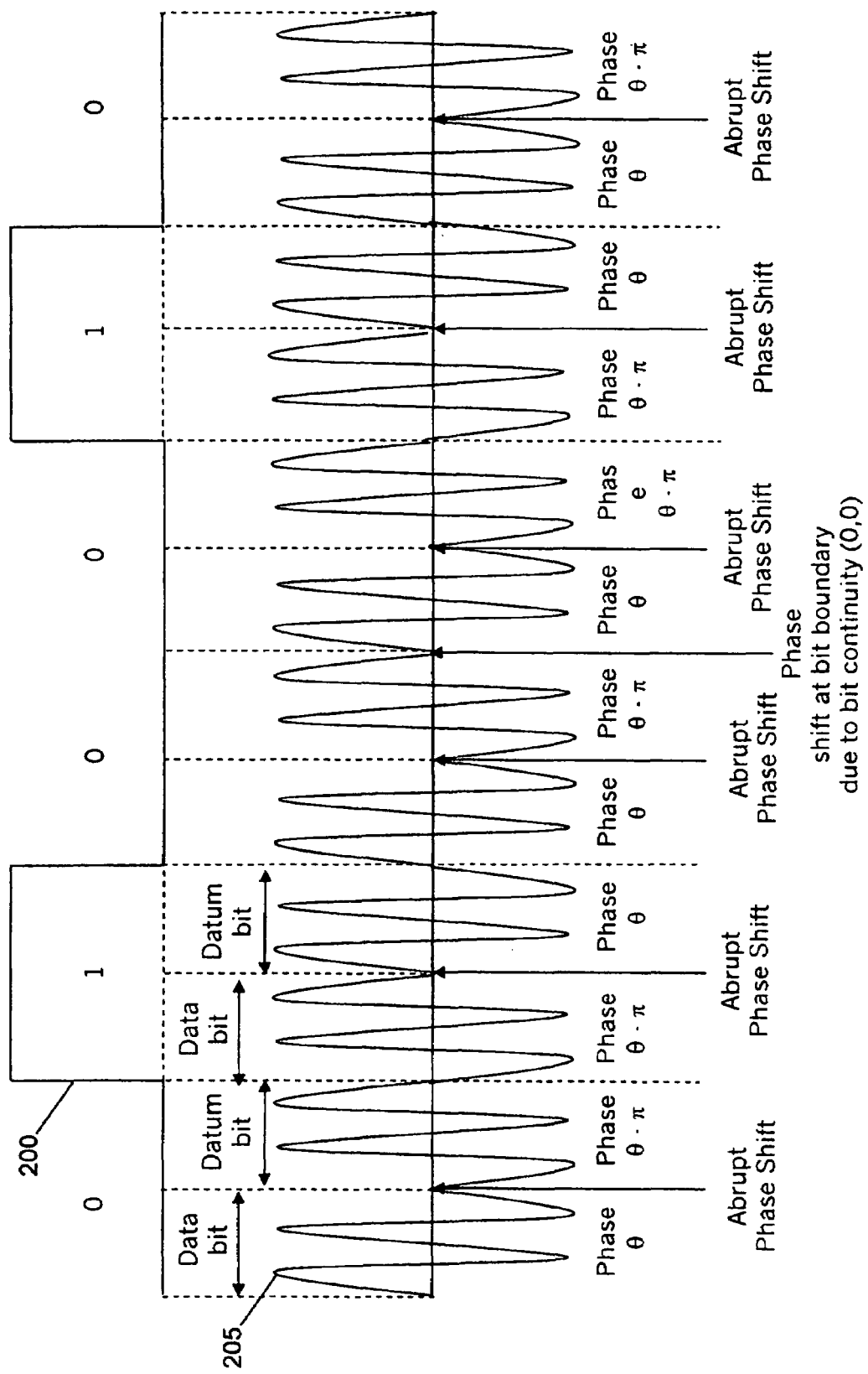
FIG. 2 is an exemplary diagram of a message signal and a USM-modulated signal according to the principles and embodiments of the present invention.

Referring to FIG. 2, an exemplary schematic diagram of a message signal and a USM-modulated signal according to the principles and embodiments of the present invention is described. Message signal 200 is a signal represented by the following binary sequence: "010010." Message signal 200 is modulated using the USM technique of the present invention into a sinusoidal carrier having a given carrier frequency, which in this case is four cycles per pulse-width. For example, if a pulse representing a single bit lasts one second, then the carrier frequency would be 4 Hz, i.e., 4 cycles in one second. Alternative, if the carrier frequency is set at, for example, 20 MHz, a carrier signal with four cycles per pulse-width or four cycles per bit would result in a data rate of 5 Mbps.

Using USM to modulate message signal 200 with a sinusoidal carrier having a carrier frequency at least twice of the data rate produces modulated signal 205. Modulated signal 205 is a sinusoidal wave having abrupt phase shifts every mid-pulse. Each bit is represented with two sinusoidal patterns, a "data bit" pattern lasting for the first half of the pulse-width, e.g., for the first two cycles of the carrier frequency, and a "datum bit" pattern lasting for the second half of the pulse-width, e.g., for the last two cycles of the carrier frequency.

A data bit pattern for a given binary digit, e.g., "0" or "1," has a phase that is 1800 degrees away from the phase of the datum bit pattern. Additionally, a data bit pattern for a given binary digit has a phase that is 180° degrees away from the phase of the data bit pattern of the other binary digit. For example, as illustrated, a data bit pattern for a "0" bit has a phase of θ while the datum bit pattern for the "0" bit has a phase of θ−π. Conversely, a data bit pattern for a "1" bit has a phase of θ−π while the datum bit pattern for the "1" bit has a phase of θ.

The main characteristic of the USM technique lies in the abrupt phase shifts occurring mid-pulse. The abrupt phase shifts may be viewed as another layer of phase reversals occurring on top of traditional BPSK modulation techniques, in which phase shifts occur only at the bit transitions, i.e., at the edge of each pulse. Having the datum bit pattern inserted in each pulse ensures a return-to-zero modulation technique with a DSSC frequency spectrum, i.e., without energy in the carrier frequency, as described hereinbelow.

It should be understood by one skilled in the art that the carrier signal, carrier frequency, and phase values used to modulate a signal according to the USM technique may all be selected as desired. Further, it should be understood by one skilled in the art that the abrupt phase shifts may be of π+/−φ degrees, where φ is any phase value between 0 and 180 degrees. It should also be understood by one skilled in the art that the phase of the data bit pattern for the "0" bit may be selected as desired, with the corresponding data bit pattern for the "1" bit being a phase shift away.

Figure 3:
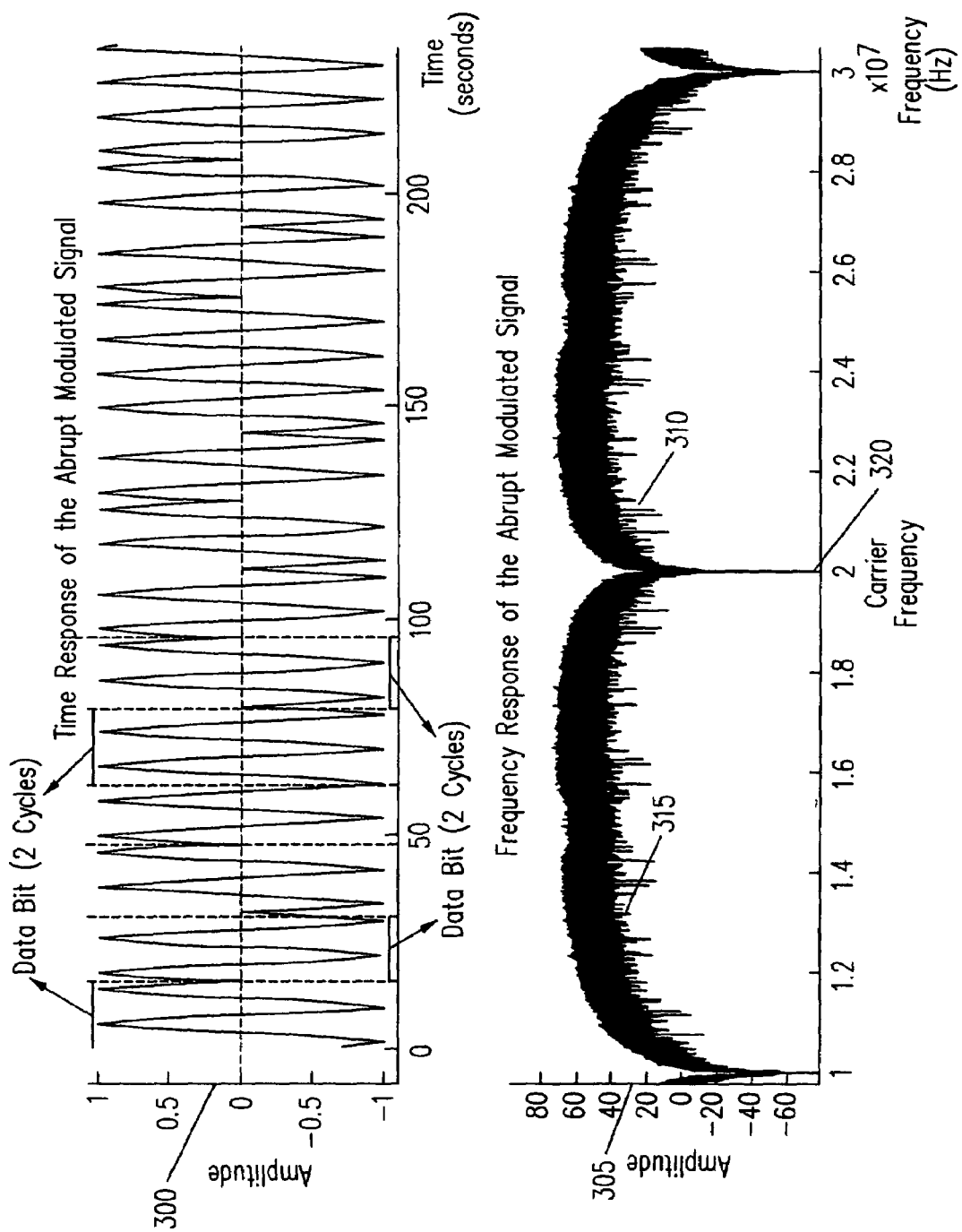
FIG. 3 is an exemplary diagram of a USM-modulated signal and its frequency spectrum according to the principles and embodiments of the present invention.

The use of the USM technique results in a DSSC modulated signal having a frequency spectrum containing two wide spectrum sidebands and no carrier. Referring now to FIG. 3, an exemplary schematic diagram of a USM-modulated signal and its frequency spectrum according to the principles and embodiments of the present invention are described. Modulated signal 300 is represented in the frequency domain by frequency spectrum 305. Frequency spectrum 305 has two main symmetric sidebands, upper sideband 310 and lower sideband 315, which are respectively above and below carrier frequency 320 at 20 MHz. Upper sideband 310 extends to 30 MHz, while lower sideband 320 extends to 10 MHz, thereby resulting in a USM-modulated signal bandwidth of 20 MHz.

Since the sidebands are symmetric, transmission of both sidebands is not required. A message signal may be USM-modulated and transmitted in a SSSC system, that is, transmitted with a single sideband. However, since the USM technique represents all the information in the message signal with the abrupt phase shifts occurring in the USM-modulated signal, all the information conveyed in the message signal may be recovered by knowing where the phase shifts occur or by preserving the positions of the phase shifts during transmission. That is, if the phase shifts are known, the original message signal can be recovered. For example, as illustrated in FIG. 2, knowing the initial phase of the USM-modulated signal corresponds to a "0," the positions of the phase shifts every mid-pulse, and the occurrence of a phase shift at the beginning of a pulse when there is continuity in the bit pattern conveys enough information for a receiver to be able to recover the original message signal.

As a result, transmission may be accomplished by transmitting only a narrow band of frequencies required for identifying the phase shifts, i.e., by transmitting only a portion of one or both sidebands in the USM-modulated signal within a narrow band of frequencies. The USM-modulated signal may therefore be filtered with a very sharp narrowband filter as described hereinbelow that preserves the abrupt phase shifts in the USM-modulated signal and attenuates the other frequency components. Because the phase shifts are abrupt, i.e., occurring at once with an immediate change in phase, the sudden shift in phase is reflected in the wide spectrum sidebands that may be filtered out by a narrowband filter as described hereinbelow to produce a filtered USM-modulated signal that ramps up and down according to the phase shifts. The ramping up and down in the filtered USM-modulated signal is a result of the return-to-zero USM technique.

Figure 4:
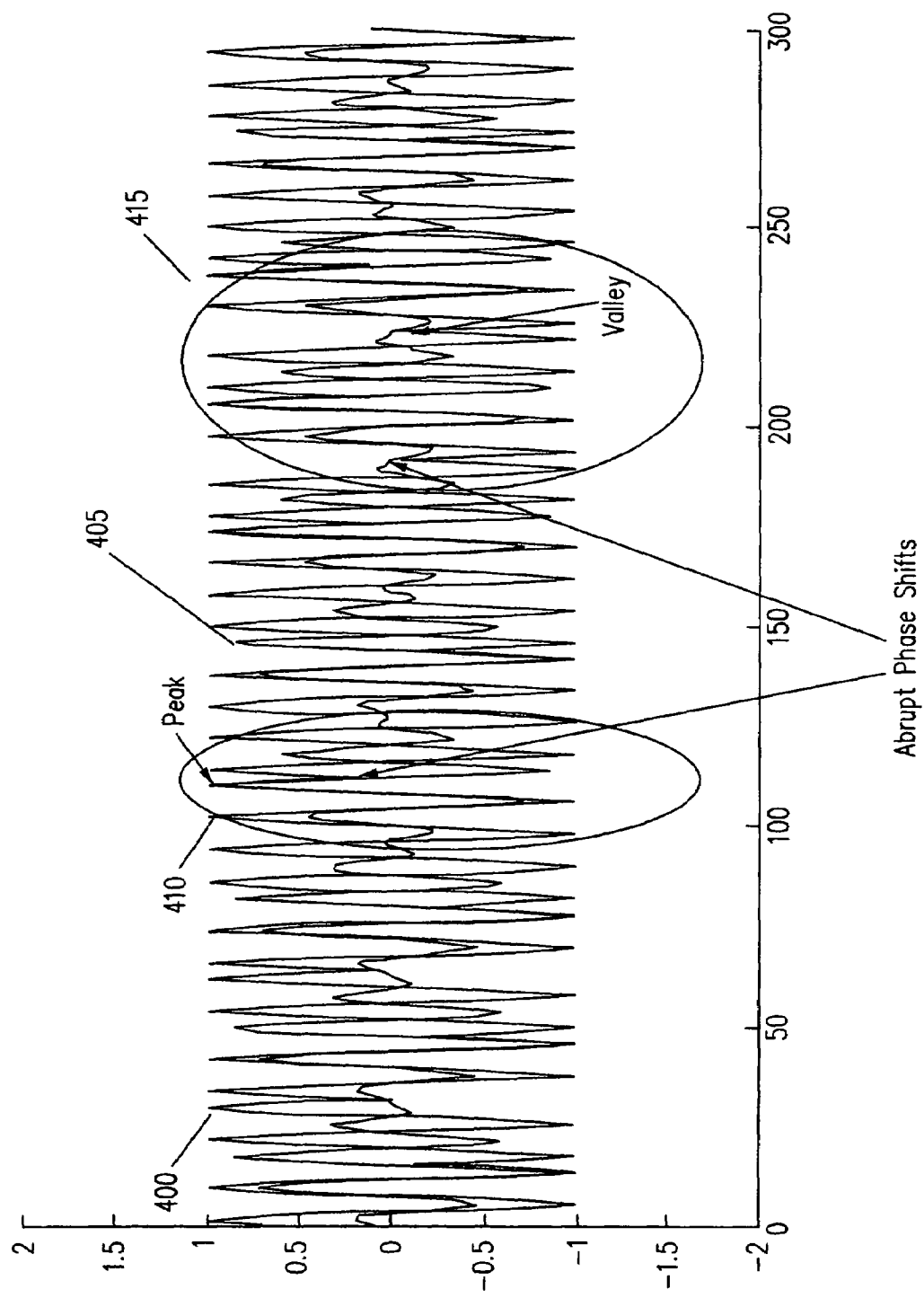
FIG. 4 is an exemplary diagram showing a USM-modulated signal and the filtered USM-modulated signal filtered with a filter designed according to the principles and embodiments of the present invention.

Referring now to FIG. 4, an exemplary diagram showing a USM-modulated signal and the filtered USM-modulated signal filtered with a filter designed according to the principles and embodiments of the present invention is described. USM-modulated signal 400 is filtered out by a narrowband filter to generate filtered USM-modulated signal 405. The narrowband filter used to generate filtered USM-modulated signal 405 has a given center frequency and a given bandwidth that were selected by simulation to produce the desired result of accurately preserving the abrupt phase shifts in the USM-modulated signal within a band as narrow as possible. As described hereinbelow, the center frequency and bandwidth of the narrowband filter may be selected based on fractal modeling of the frequency spectrum of USM-modulated signal 400. Doing so ensures an even more accurate filtering process, that is, an even more accurate positioning of the abrupt phase shifts occurring in USM-modulated signal 400.

As illustrated, abrupt phase shifts occurring in USM-modulated signal 400 determine peaks or valleys in filtered USM-modulated signal 405, which ramps up and down according to the abrupt phase shifts. For example, abrupt phase shift 410 in USM-modulated signal 400 results in a peak in filtered USM-modulated signal 405 while abrupt phase shift 415 in USM-modulated signal 400 results in a valley in filtered USM-modulated signal 405.

It should be understood by one skilled in the art that the narrowband filter must be carefully chosen in order to accurately capture the position of the phase shifts in the USM-modulated signal. As described hereinbelow, it will be appreciated that the narrowband filter must be a high-Q, low tolerance, linear-phase filter with a very sharp passband, very sharp transition bands, and very sharp stopbands. In one embodiment, the filter is designed to have a passband ripple of no more than 0.1 dB and a uniform stopband attenuation of at least 60 dB. Such a filter is designed based on fractal modeling of the frequency spectrum of a USM-modulated signal.

Figure 5:
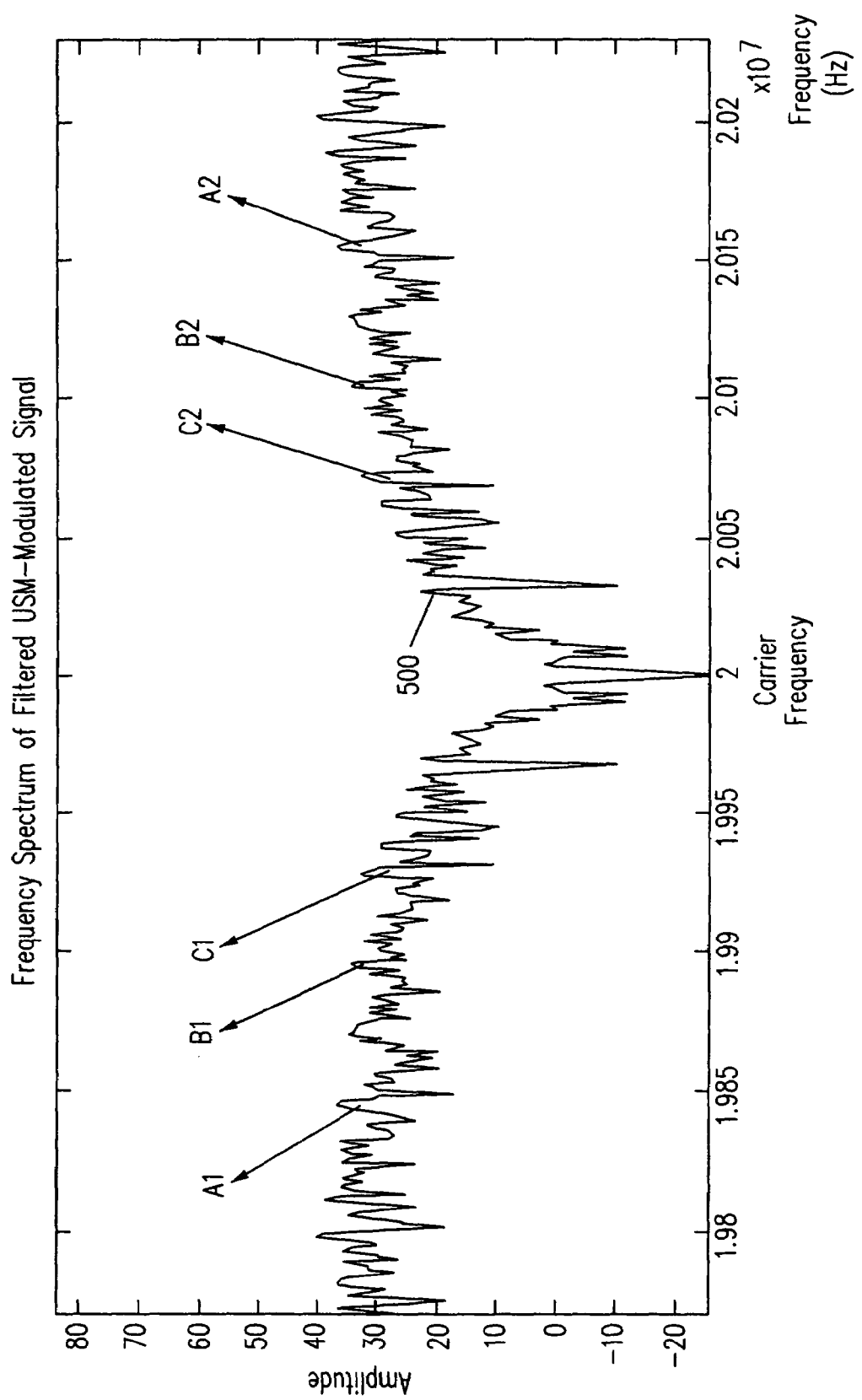
FIG. 5 is an exemplary diagram of a magnified frequency spectrum of a USM-modulated signal according to the principles and embodiments of the present invention.

Modulating a signal with the USM technique of the present invention produces a USM-modulated signal having a unique DSSC frequency spectrum. The unique feature of the frequency spectrum is that the abrupt phase shifts occurring mid-pulse result in sidebands that have repeating self-similar spectral lines that may be modeled using fractal bifurcation patterns or fractal primitives. Referring now to FIG. 5, an exemplary schematic diagram of a magnified frequency spectrum of a USM-modulated signal according to the principles and embodiments of the present invention is described.

Frequency spectrum 500 has two main sidebands that are symmetric around the carrier frequency. The symmetry of the sidebands is reflected in the self-similar patterns A1-A2, B1-B2, and C1-C2. These self-similar patterns are modeled with fractal primitives, as described hereinbelow, and aid in the selection of a center frequency and a filter bandwidth for the narrowband filter of the present invention.

II. Fractal Modeling of Sidebands

The self-similar patterns present in frequency spectrum 500 shown in FIG. 5 may be modeled using a set of fractal bifurcation patterns or fractal primitives. Referring now to FIGS. 6A-B, exemplary diagrams of two sets of fractal primitives for modeling the frequency spectrum of a USM-modulated signal according to the principles and embodiments of the present invention are described. Fractal primitive 600 in FIG. 6A is a bifurcating fractal primitive with a trapezoidal shape. Fractal primitive 614 in FIG. 6B is a bifurcating fractal primitive with an arch-like shape. Fractal primitives 600 and 614 may be generated by any fractal pattern generator capable of generating fractals, such as various fractal pattern generators implemented as software routines. For example, a Moire or Mandelbrot fractal pattern generator as implemented in the art with Java™ or Matlab™ may be used to generate fractal patterns.

Both fractal primitives 600 and 614 have two symmetric bifurcations, an inner bifurcation and an outer bifurcation, that may be further bifurcated to generate additional bifurcations at different scales, resolutions, or levels of detail. The bifurcation process can be thought of in terms of a "fractal bifurcation tree," with each level of the tree representing a different scale, resolution, or level of detail. The root of the tree corresponds to the original fractal primitive, e.g., fractal primitive 600 in FIG. 6A or fractal primitive 614 in FIG. 6B.

At each subsequent level in the fractal bifurcation tree, each bifurcation generates an additional fractal primitive that has the exact same structure as its originating fractal primitive, except that it is at a lower scale or higher resolution. Each outer bifurcation in the new fractal primitive is centered at the outer edges of its previous bifurcation. For example, bifurcating fractal primitive 600 generates fractal primitives 602 and 604, with the same structure as fractal primitive 600 and with the outer bifurcations of fractal primitives 602 and 604 centered at the outer edges of fractal primitive 600. Similarly, bifurcating fractal primitive 614 generates fractal primitives 616 and 618, with the same structure as fractal primitive 614 and with the outer bifurcations of fractal primitives 616 and 618 centered at the outer edges of fractal bifurcation 614.

Each bifurcation step is indexed with an integer, referred to herein as the "fractal bifurcation index." The fractal bifurcation index indicates the scale, level of detail, or depth within the fractal bifurcation tree. At each scale or level in the fractal bifurcation tree, there are $2^N$ fractal primitives, where N is the fractal bifurcation index. For example, N=0 denotes the root or start of the fractal bifurcation tree with original fractal primitives 600 (FIG. 6A) and 614 (FIG. 6B). At N=1, there are two fractal primitives, 602-604 at FIGS. 6A and 616-618 at FIG. 6B. At N=2, there are four fractal bifurcations, 606-612 at FIGS. 6A and 620-626 at FIG. 6B.

Figure 7:
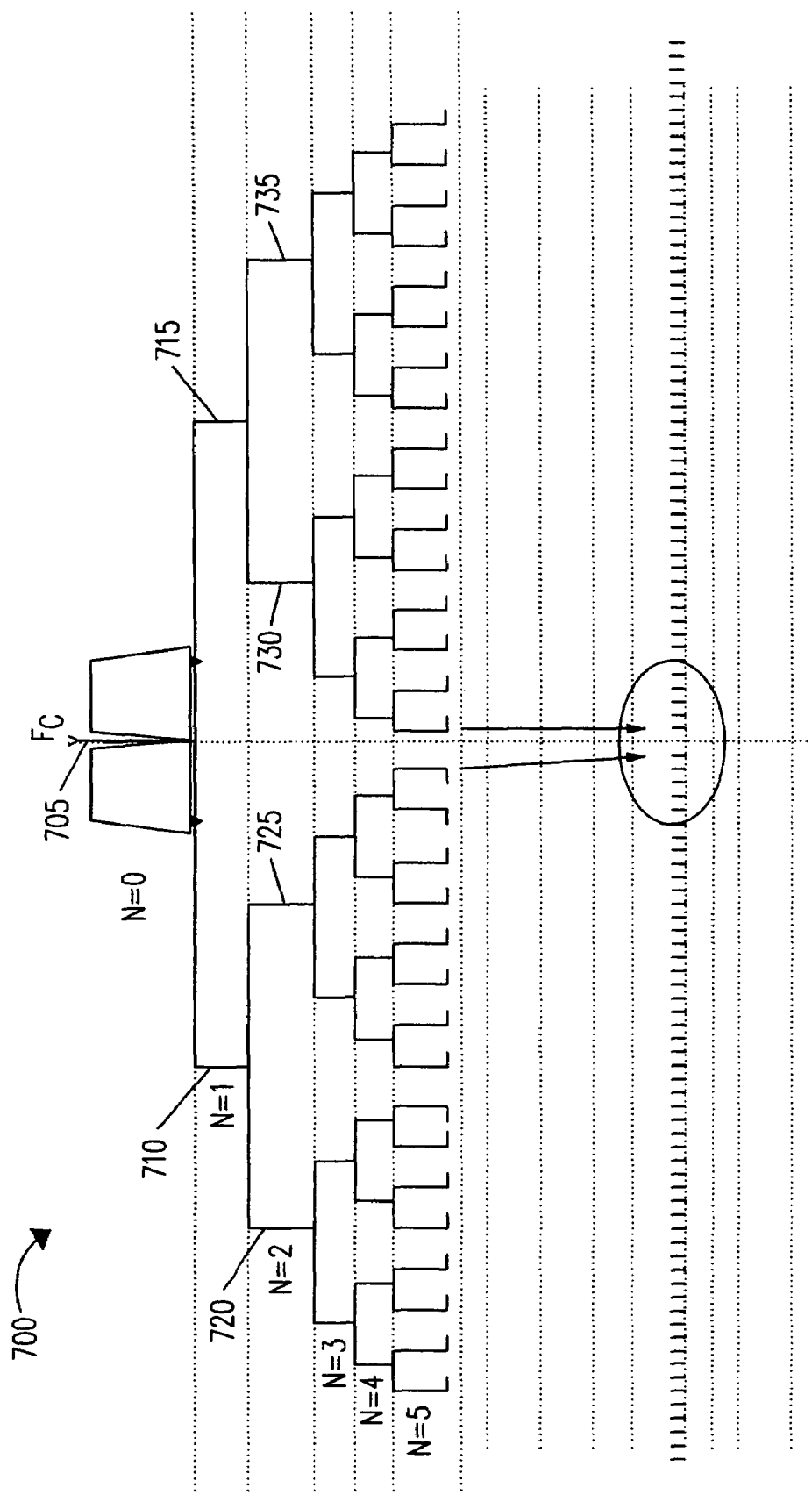
FIG. 7 is an exemplary fractal bifurcation tree generated according to the principles and embodiments of the present invention.

Referring now to FIG. 7, an exemplary fractal bifurcation tree generated according to the principles and embodiments of the present invention is described. Fractal bifurcation tree 700 is shown at a depth or fractal bifurcation index of 5, i.e., at 5 different scales or levels of detail. Each vertical line beyond the tree root corresponds to one fractal primitive generated off fractal primitive 705. At each level of the tree, twice the fractal primitives in the previous level, i.e., $2^N$ fractal primitives, are generated. For example, at N=1, there are two fractal primitives, i.e., fractal primitives 710-715. At N=2, there are four fractal primitives, i.e., fractal primitives 720-735.

It will be appreciated that each fractal primitive can be thought of as two sidebands around a particular frequency. For example, fractal primitive 705 can be thought of as a very rough modeled representation of the sidebands of a USM-modulated signal. A modeled frequency spectrum that more closely resembles or approximates the sidebands of a USM-modulated signal may therefore be generated by using a set of fractal primitives at different levels of detail.

Fractal primitives, such as fractal primitives 600 (FIG. 6A) and 614 (FIG. 6B), can be used to model the frequency spectrum of a USM-modulated signal by first selecting a desired modeling accuracy, i.e., selecting how close the modeled frequency spectrum should be to the original frequency spectrum, and determining a corresponding bifurcation index required to achieve the desired accuracy. The modeled frequency spectrum may then be generated by adding all fractal bifurcations at all levels of the fractal bifurcation tree.

Figure 8:
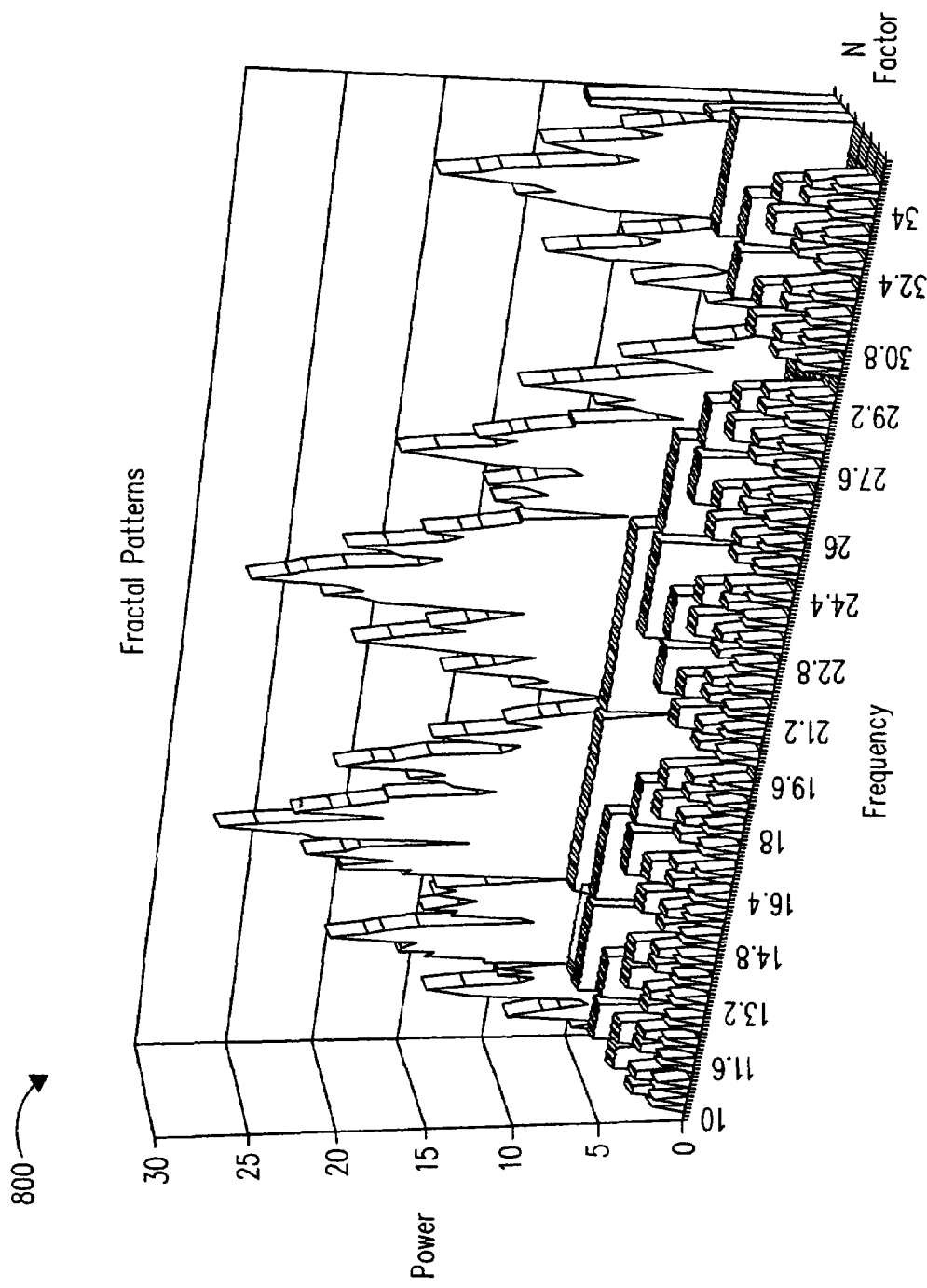
FIG. 8 is an exemplary modeled frequency spectrum generated by adding a set of fractal primitives according to the principles and embodiments of the present invention.

Referring now to FIG. 8, an exemplary modeled frequency spectrum generated by adding a set of fractal primitives according to the principles and embodiments of the present invention is described. Modeled frequency spectrum 800 was generated by adding, at each frequency, a set of fractal bifurcations at a fractal bifurcation index of N=6. As it can be seen from the figure, the higher the fractal bifurcation index used to generate a modeled frequency spectrum, the higher the resolution and the closer to the spectrum of the USM-modulated signal the modeled frequency spectrum would be.

It should be understood by one skilled in the art that centering the outer bifurcations of fractal primitives at a given tree depth at the outer edges of the fractal primitives at the previous tree depth ensures that the filtered frequency spectrum will return-to-zero at the carrier frequency, i.e., 20 MHz for the sinusoidal carrier signal used to generate USM-modulated signal 300 shown in FIG. 3, and at the lower and upper limits of the USM-modulated signal bandwidth, i.e., at 10 and 30 MHz.

III. Fractal-Based Digital Filter Design

It will be appreciated that using a fractal bifurcation tree to model the frequency spectrum of a USM-modulated signal may be thought of as dividing the bandwidth of the USM-modulated signal into $2^N$ bifurcations. The USM-modulated signal having modeled frequency spectrum 800 shown in FIG. 8 and magnified frequency spectrum 500 shown in FIG. 5 was filtered with a digital filter having a given center frequency and a given bandwidth that were selected by simulation to produce the desired result of accurately preserving the abrupt phase shifts in the USM-modulated signal within a band as narrow band as possible. However, since the frequency spectrum of the USM-modulated signal may be modeled with the fractal bifurcations as described hereinabove, a higher-precision digital filter may be designed based on the fractal bifurcations required to achieve the return-to-zero characteristics of the frequency spectrum of the USM-modulated signal.

Figure 9:
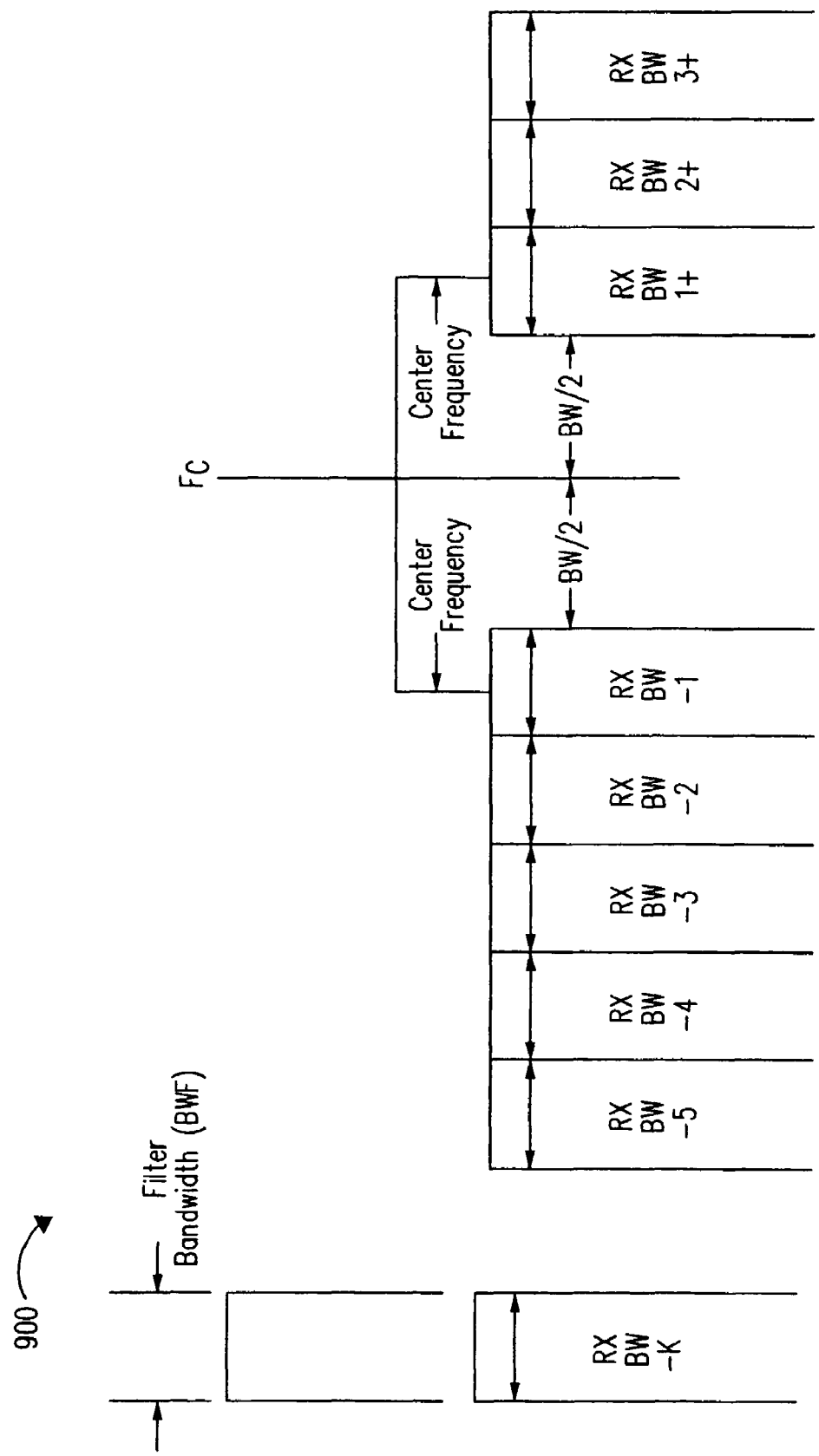
FIG. 9 is an exemplary schematic diagram showing the selection of a filter bandwidth and center frequency according to a fractal bifurcation tree.

Referring now to FIG. 9, an exemplary schematic diagram showing the selection of a filter bandwidth and center frequency according to a fractal bifurcation tree is described. Designing a high-Q, low tolerance narrowband digital filter to preserve the abrupt phase shifts in a USM-modulated signal, e.g., USM-modulated signal 400 shown in FIG. 4, starts with the realization that the filter bandwidth may be selected as the narrow bandwidth needed to model the frequency spectrum of the USM-modulated signal with the fractal primitives, as illustrated in diagram 900.

This narrow bandwidth is a fraction of the total bandwidth of the USM-modulated signal. The fraction of the total bandwidth is given by the division of the frequency spectrum of the USM-modulated signal into $2^N$ fractal primitives. That is, the bandwidth of the filter, denoted herein by BWF, may be selected as:

$$BWF \approx \frac{BW}{2^N} \qquad (1)$$

where BW is the total bandwidth of the USM-modulated signal and N is the fractal bifurcation index.

The total bandwidth of the USM-modulated signal may be given, in turn, by a desired data rate for transmission. For example, with the carrier signal used to generate USM-modulated signal 205 of FIG. 2 having 4 cycles per pulse-width, the bandwidth of the total modulated signal may be given by four times the desired data rate, that is:

$$BWF \approx \frac{4 \times DataRate}{2^N} = \frac{DataRate}{2^{N-2}} \qquad (2)$$

The bandwidth of the high-Q, low tolerance narrowband digital filter that may be used to preserve the abrupt phase shifts in a USM-modulated signal may therefore be given as a function of a desired data rate and a fractal bifurcation index. Similarly, the center frequency of the digital filter, denoted herein as $F_F$, may be given as a function of the desired data rate, fractal bifurcation index and the carrier frequency $F_C$, according to:

$$F_F \approx F_C \pm (2^N - K) \frac{DataRate}{2^{N-1}} \quad (3)$$

$\forall K=2M-1$, where $M=1:(2^{N-1})$, and $N \neq 0$.

Accordingly, the capacity of a communications system (given in bits/sec/Hz) that uses the USM-modulation technique of the present invention and a high-Q, low tolerance, linear-phase narrowband digital filter designed with a bandwidth and center frequency as above to transmit a fraction of a sideband of a USM-modulated signal may be given by:

$$C = 2^{N-2} \quad (4)$$

It should be understood by one skilled in the art that Equation (3) described hereinabove gives the values of the center frequency $F_F$ within the range of the frequency spectrum from $(F_c - BWF)$ to $(F_c + BWF)$.

It should also be understood by one skilled in the art that other values of $F_F$ may exist outside the hereinabove mentioned range based on a given fractal bifurcation index. For example, if it is desired to select a center frequency outside the range from $(F_c - BWF)$ to $(F_c + BWF)$, the value of $F_c$ in equation (3) described hereinabove may be set to a value offset by BWF.

Figure 10:
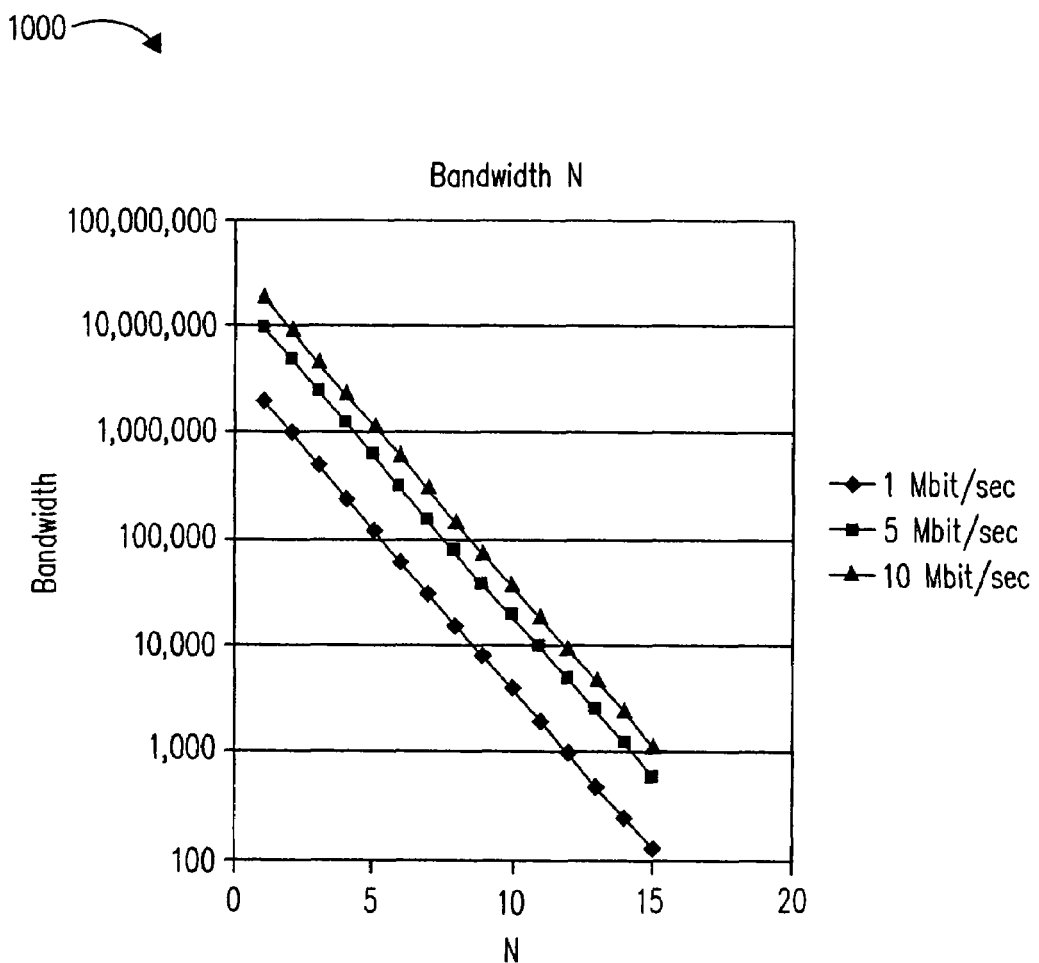
FIG. 10 is an exemplary graph of a filter bandwidth selected according to the principles and embodiments of the present invention versus a fractal bifurcation index for a given desired data rate.

Referring now to FIG. 10, an exemplary graph of a filter bandwidth selected according to the principles and embodiments of the present invention versus a fractal bifurcation index for a given desired data rate is described. Graph 1000 shows that the communications system of the present invention enables data rates exceeding 5 Mbps to be delivered through frequency channels as narrow as 50 KHz under a variety of channel conditions.

Figure 11:
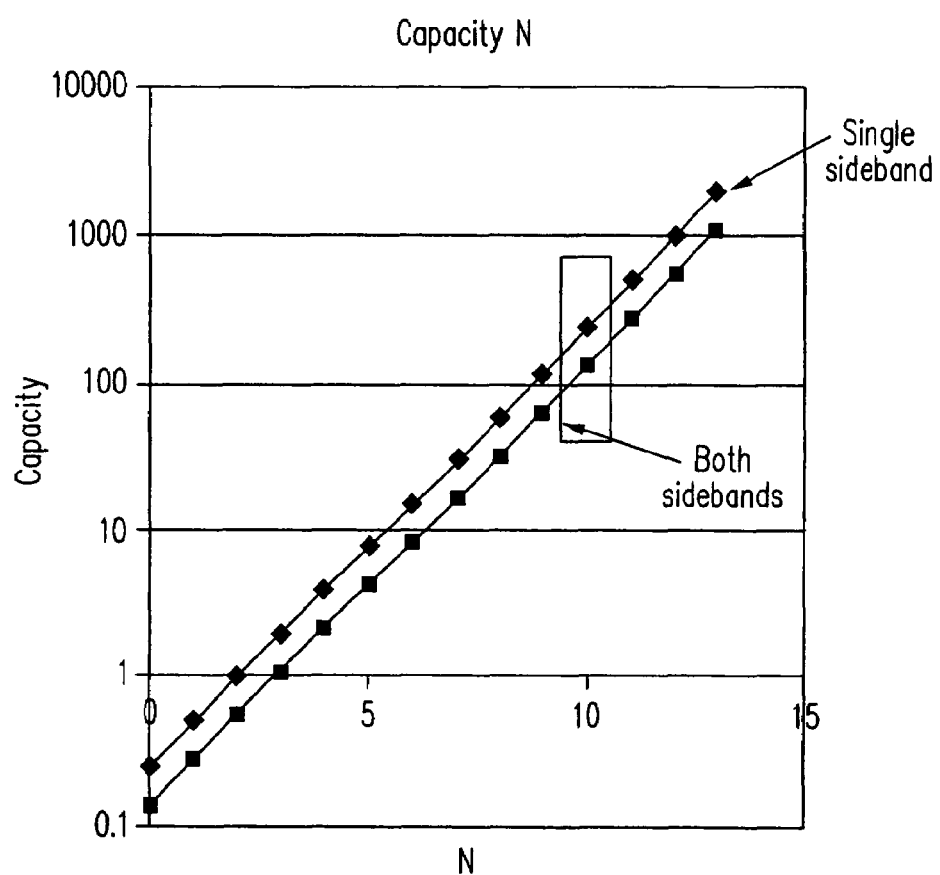
FIG. 11 is an exemplary graph showing the capacity of a communications system designed according to the principles and embodiments of the present invention versus a fractal bifurcation index.

Referring now to FIG. 11, an exemplary graph showing the capacity of a communications system designed according to the principles and embodiments of the present invention versus a fractal bifurcation index is described. Graph 1100 shows that broadband-like wireless services may be achieved with the communications system of the present invention within a very narrow frequency spectrum. Transmission of a fraction of one or two sidebands results in a capacity exceeding 100 bits/second/Hz for a fractal bifurcation index of 9 and above, far superior than any currently-available wireless communication system.

It should be understood by one skilled in the art that selecting a given fractal bifurcation index is a function of the system design for a particular application. For example, if it is desired to transmit 100 channels in a total bandwidth of 36 MHz, the fractal bifurcation index may be chosen to optimize the filter design for a given desired data rate, carrier signal, number of users accessing the channels, and so forth.

It should also be understood by one skilled in the art that the high-Q, low tolerance, linear-phase digital filter designed according to the principles and embodiments of the present invention has additional design parameters other than the filter bandwidth and center frequency selected as above. For example, to achieve a very sharp stopband, the digital filter may be designed with a uniform stopband attenuation of, for example, at least 60 dB. And to minimize the passband ripple, the filter may be designed with a passband ripple of no more than 0.1 dB. These stringent filter design conditions may generate digital filters having a large number of filter taps. Those filters may be implemented in hardware using specially configured circuit boards. With decreasing hardware costs, such filters may be easily implemented in a cost-effective manner.

Figure 12:
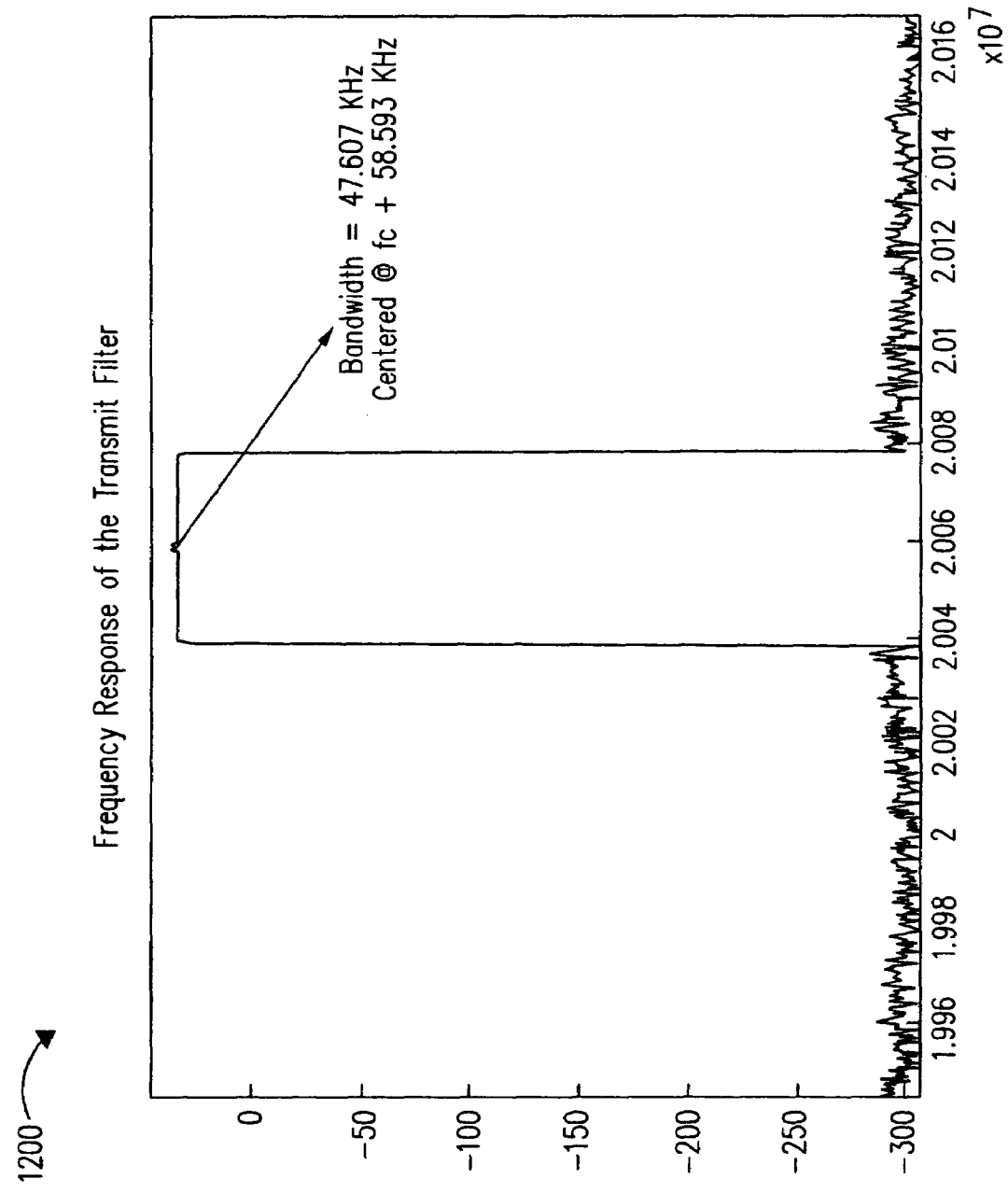
FIG. 12 is an exemplary plot showing the frequency response of a high-Q, low tolerance, linear-phase digital filter designed according to the principles and embodiments of the present invention.

Referring now to FIG. 12, an exemplary plot showing the frequency response of a high-Q, low tolerance, linear-phase digital filter designed according to the principles and embodiments of the present invention is now described. Frequency response 1200 of a high-Q, low tolerance, liner-phase digital filter designed according to the principles and embodiments of the present invention is shown with very sharp passbands, transition bands, and stopbands. The passband ripple of the digital filter having frequency response 1200 is very small to insignificant, while the stopband attenuation is very high. The bandwidth of the digital filter having frequency response 1200 was designed to be around 58.6 KHz and the center frequency was designed at approximately 47.6 KHz away from the carrier frequency used. Using such a filter enables the transmission of 5 Mbps within the very narrow bandwidth of the digital filter.

IV. Fractal-Based Transmitter Filtering Approach

Figure 13:
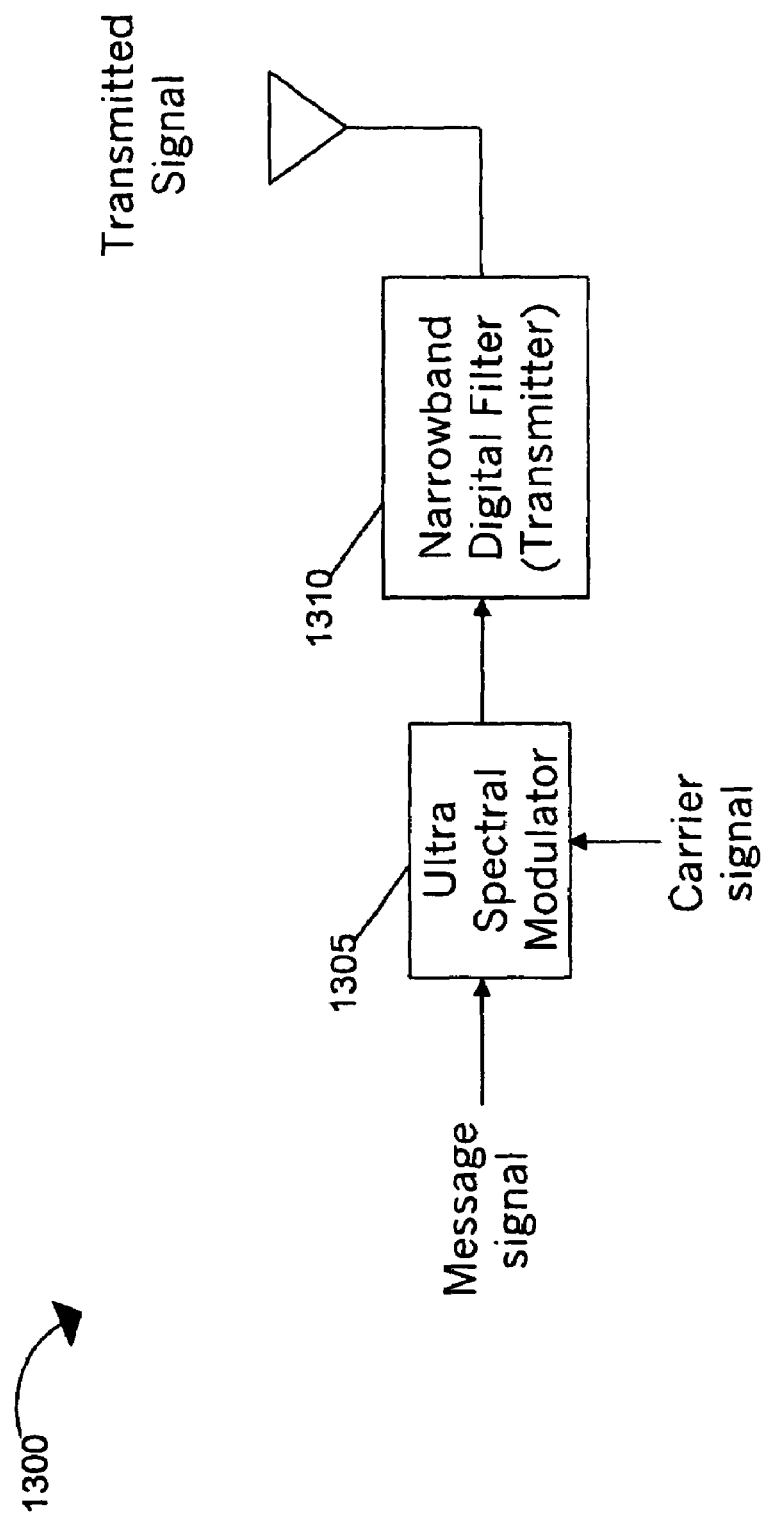
FIG. 13 is an exemplary schematic diagram of a communications transmitter system using the fractal-based transmitter filtering approach to transmit message signals through a communications channel according to the principles and embodiments of the present invention.

Referring now to FIG. 13, an exemplary schematic diagram of a communications transmitter system using the fractal-based transmitter filtering approach to transmit message signals through a communications channel according to the principles and embodiments of the present invention is described. Communications transmitter system 1300 may be used to transmit a message signal according to the principles and embodiments of the present invention by using USM modulator 1305 to modulate the message signal into a carrier signal and high-Q, low tolerance, linear-phase digital filter 1310 designed as above, such as the digital filter having frequency spectrum 1200 shown in FIG. 12, to filter the USM-modulated signal.

It should be understood by one skilled in the art that additional functional blocks may be present in communications transmitter system 1300, such as a channel encoder to introduce redundancy in the message signal prior to modulation by USM modulator 1305 and a transmitter circuit having an amplifier to amplify the message signal prior to transmission through a communications channel.

V. Fractal-Based Look-Up Table Transmitter Approach

Figure 14:
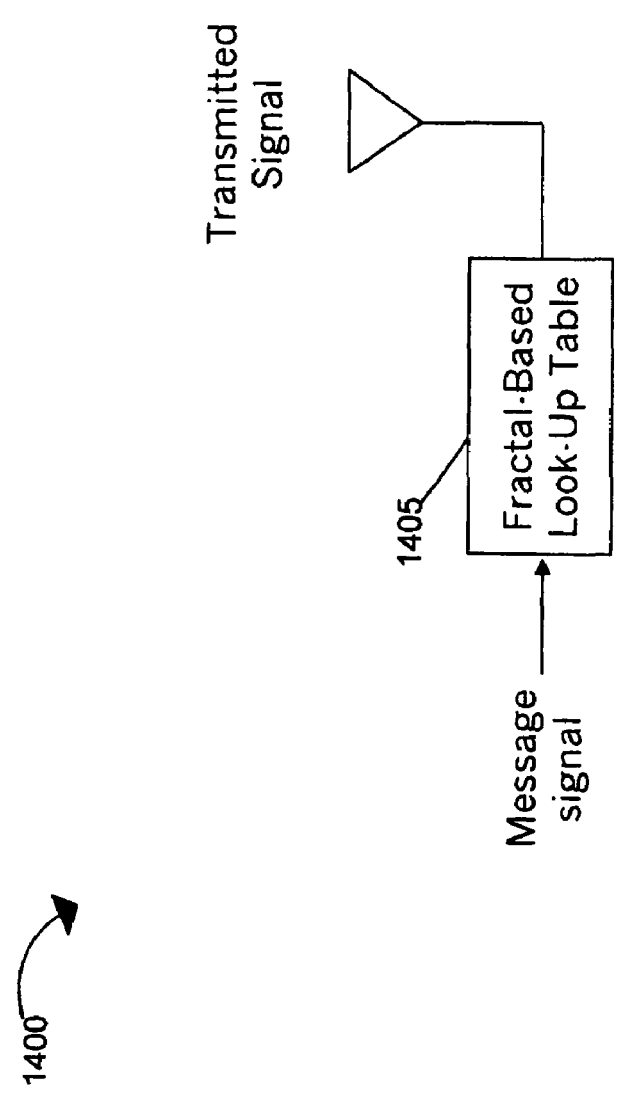
FIG. 14 is an exemplary schematic diagram of a communications transmitter system using the fractal-based look-up table transmitter approach to transmit message signals through a communications channel according to the principles and embodiments of the present invention.

Referring now to FIG. 14, an exemplary schematic diagram of a communications transmitter system using the fractal-based look-up table transmitter approach to transmit message signals through a communications channel according to the principles and embodiments of the present invention is described. Communications transmitter system 1400 may be used to transmit a message signal according to the principles and embodiments of the present invention via a simple look-up table operation. Fractal-based look-up table 1405 is generated by sampling a modeled USM-modulated signal, such as modeled USM-modulated signal with modeled frequency spectrum 800 shown in FIG. 8.

Since the frequency spectrum of a USM-modulated signal may be modeled with fractal bifurcation patterns as described hereinabove, an alternative embodiment to transmission of a message signal involves sampling the modeled USM-modulated signal as above and transmitting the samples through the communications channel. Sampling the modeled USM-modulated signal is an approximation to sampling a USM-modulated signal filtered with a narrow-band digital filter, as performed in communications system 1300 shown in FIG. 13.

Fractal-based look-up table 1405 therefore stores samples extracted from the time response counterpart of a modeled frequency spectrum of a USM-modulated signal. The samples are independent of the USM-modulated signal, that is, they may be extracted from the time response counterpart of a fractal-modeled frequency spectrum of any USM-modulated signal and used in the transmission of any USM-modulated signal.

In one embodiment, fractal-based look-up table 1405 contains two rows of samples, with each row corresponding to a different binary symbol, e.g., "0" or "1." The samples for each binary symbol are extracted by observing the modeled frequency spectrum of a USM-modulated signal and noting which patterns arise as a result of an abrupt phase shift corresponding to a "0" or a "1." Transmission of a binary symbol in a message signal is accomplished by simply encoding the symbol into its corresponding samples stored in look-up table 1405.

It should be understood by one skilled in the art that this fractal-based look-up table transmission approach is very simple and cost-effective to implement, in addition to achieving high data rates within a very narrow frequency spectrum. It should also be understood by one skilled in the art that such a system employs high oversampling to reduce the noise in the system and achieve the desired data rates without being significantly affected by channel distortions. For example, if 32 samples are used for each binary symbol and the carrier signal used has a carrier frequency of 20 MHz, the sampling rate is 160 MHz. For a channel of 50 KHz, desired data rates of 5 Mbps and above can still be achieved.

VI. Fractal-Based Receiver Filtering Approach

Figure 15:
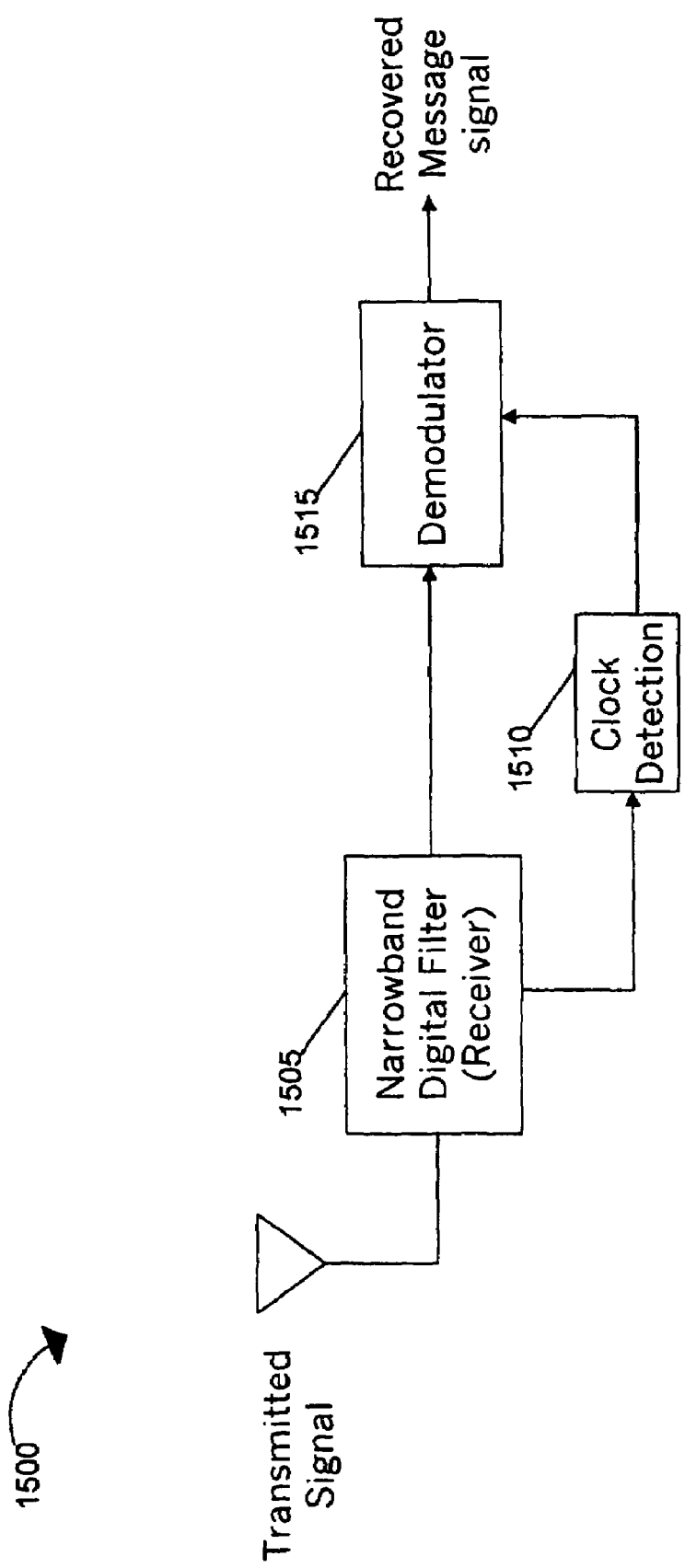
FIG. 15 is an exemplary schematic diagram of a communications receiver system using the fractal-based receiver filtering approach to recover message signals transmitted through a communications channel according to the principles and embodiments of the present invention.

Referring now to FIG. 15, an exemplary schematic diagram of a wireless communications receiver system using the fractal-based receiver filtering approach to recover message signals transmitted through a communications channel according to the principles and embodiments of the present invention is described. Communications receiver system 1500 may be used to recover a message signal transmitted according to the principles and embodiments of the present invention by first filtering the transmitted signal with high-Q, low tolerance, linear-phase digital filter 1505. Digital filter 1505 is a filter designed based on high-Q, low tolerance, linear-phase digital filter 1310 shown in FIG. 13. The center frequency of digital filter 1310 is selected as a function of a carrier frequency, a fractal bifurcation index and a desired data rate as given in equation (3) described hereinabove. The bandwidth of digital filter 1505 is selected as a function of a fractal bifurcation index and a desired data rate with the addition of a small band of frequencies to take into account channel distortions such as fading and inter-symbol interference, as follows:

$$BWF \approx \frac{4 \times DataRate}{2^N} \pm \delta = \frac{DataRate}{2^{N-2}} \pm \delta \quad (5)$$

where δ is the small band of frequencies related to a guard band, DataRate is the desired data rate and N is the fractal bifurcation index.

It should be understood by one skilled in the art that equation (5) is derived from equation (2) above giving the bandwidth of a digital transmitter filter, with the addition of the small band of frequencies δ.

Figure 16:
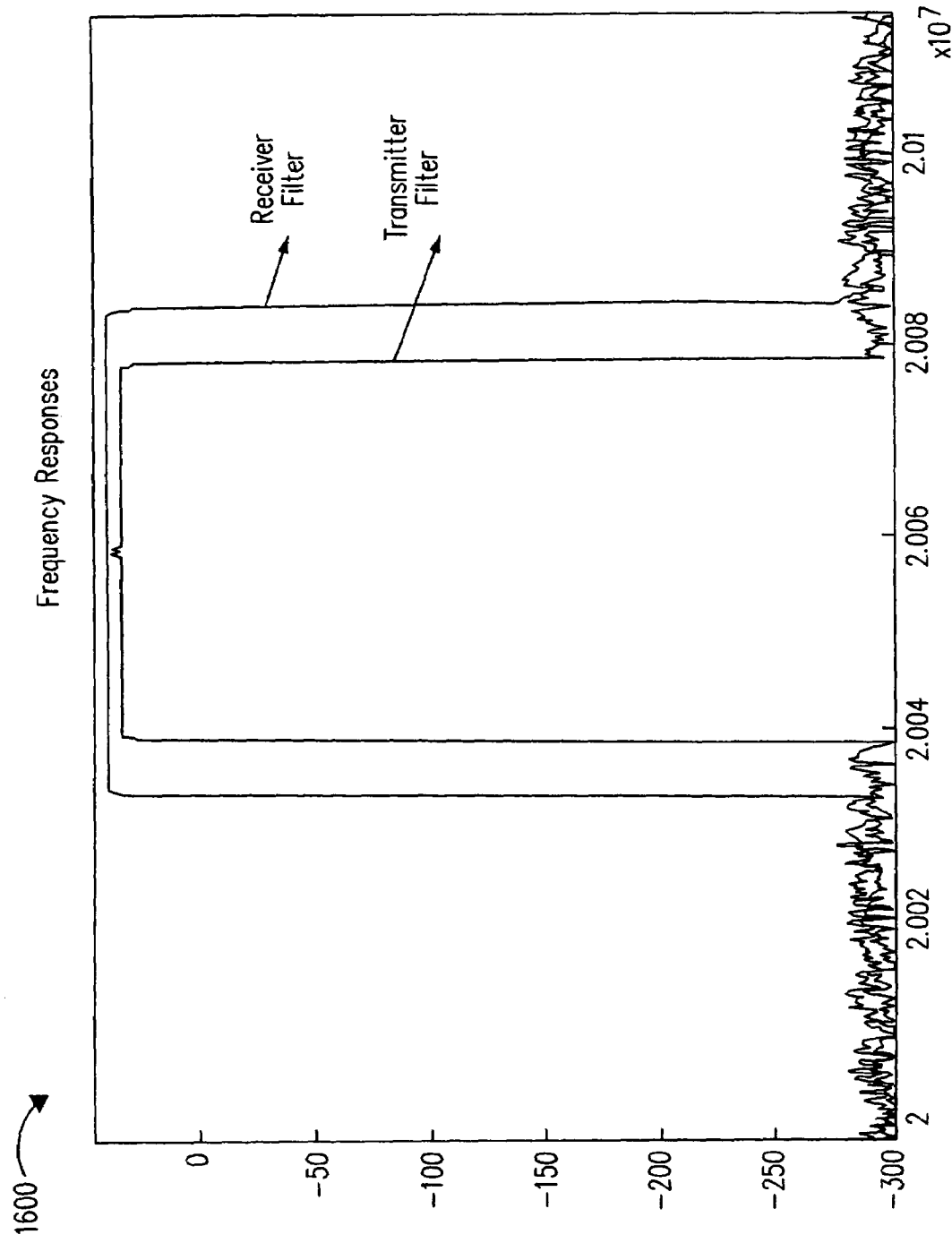
FIG. 16 is an exemplary plot showing the frequency response of a high-Q, low tolerance, linear-phase digital receiver filter superimposed with the frequency response of a high-Q, low tolerance, linear-phase digital transmitter filter designed according to the principles and embodiments of the present invention.

Referring now to FIG. 16, an exemplary plot showing the frequency response of a high-Q, low tolerance, linear-phase digital receiver filter superimposed with the frequency response of a high-Q, low tolerance, linear-phase digital transmitter filter designed according to the principles and embodiments of the present invention is described. As illustrated in plot 1600, the frequency response of receiver filter 1505 is slightly wider than the frequency response of a transmitter filter designed as described hereinabove, such as transmitter filter 1310 shown in FIG. 13. The frequency response of receiver filter 1505 also shows that receiver filter 1505 has slightly smaller passband ripple and an even sharper stopband than its corresponding transmitter filter, such as transmitter filter 1310 shown in FIG. 13.

Referring back to FIG. 15, once the transmitted signal is filtered by receiver filter 1505, the transmitter clock is recovered and used to phase-lock the receiver clock by clock detection circuitry 1510. The phase-locked receiver clock is then used to synchronize communications receiver 1500 with the transmitted signal in order to extract the binary symbols in the message signal encoded into the abrupt phase shifts in the transmitted signal. The message signal is recovered by demodulator 1515.

Figure 17:
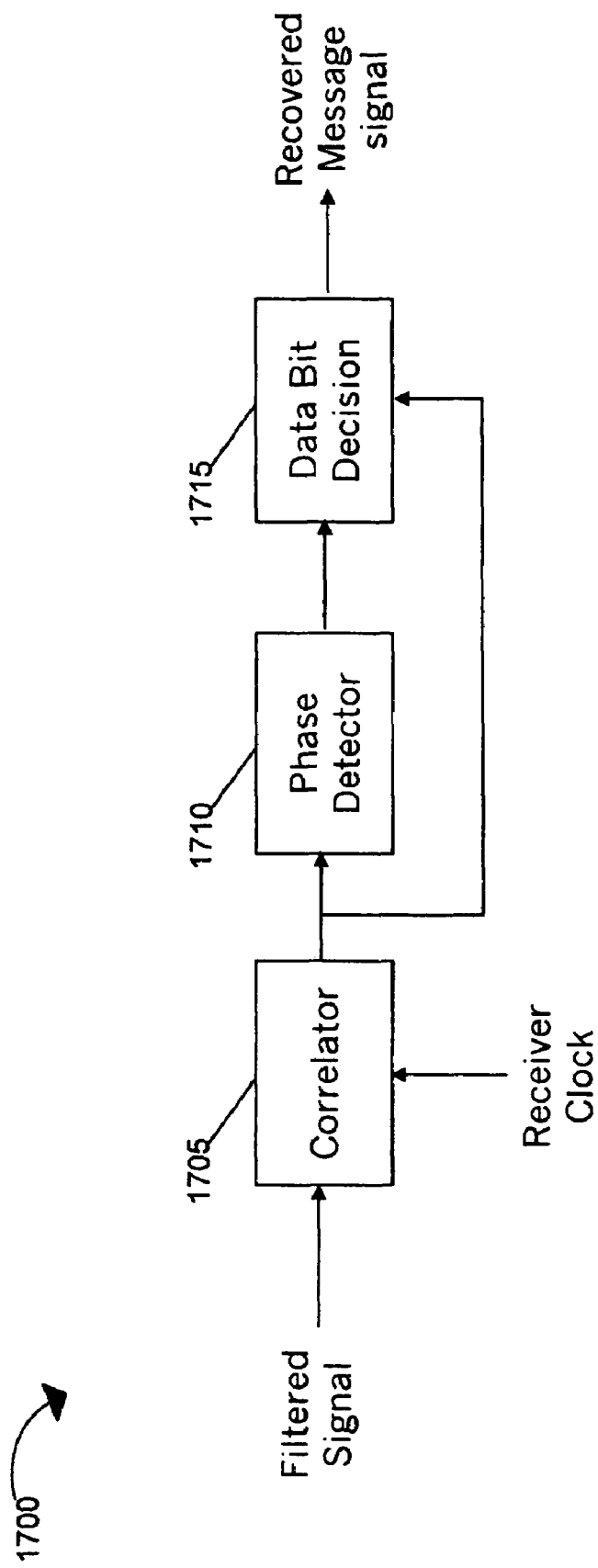
FIG. 17 is an exemplary schematic diagram of a demodulator for use with the communications receiver system shown in FIG. 15.

Referring now to FIG. 17, an exemplary schematic diagram of a demodulator for use with the communications receiver system shown in FIG. 15 is described. Demodulator 1700 recovers a message signal transmitted by communications transmitter system 1300 shown in FIG. 13 or communications transmitter system 1400 shown in FIG. 14. The first step towards recovering the message signal is performed by correlator 1705, which correlates the phase-locked receiver clock with the filtered transmitted signal, i.e., with the transmitted signal filtered by receiver filter 1505 shown in FIG. 15, in order to extract the transmitted signal at the desired frequencies. Correlator 1705 may be implemented with any correlator circuitry known to one skilled in the art, including matched filter circuitry.

Figure 18:
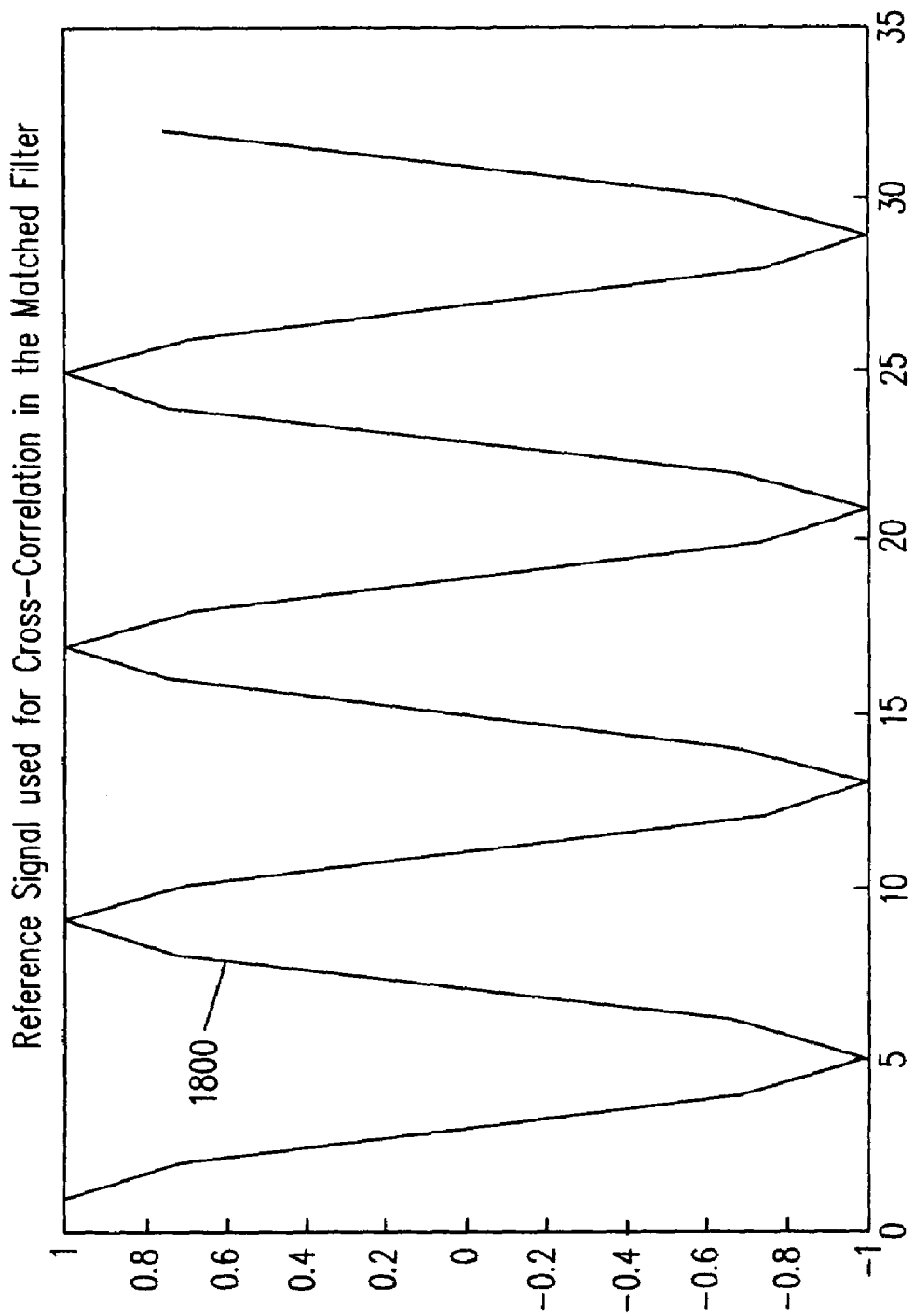
FIG. 18 is an exemplary plot showing a reference signal to be used in a matched filter according to the principles and embodiments of the present invention.

Referring now to FIG. 18, an exemplary plot showing a reference signal to be used in a matched filter according to the principles and embodiments of the present invention is described. Reference signal 1800 is a zero-phase four-cycle sinusoidal wave generated at the center frequency selected for the transmitter filter used to transmit a message signal for recovery by demodulator 1705, such as transmitter filter 1310 shown in FIG. 13 and designed based on the fractal modeling as described hereinabove. Reference signal 1800 may be used in correlation with the filtered transmitted signal in blocks of four cycles to generate a noiseless output signal with the same phase as the transmitted signal.

The matched filter employs four-cycle reference signal 1800 in a receiver system for which the corresponding transmitter employs a USM technique using four cycles per pulse-width to modulate a binary symbol into a sinusoidal carrier signal. It should be understood by one skilled in the art that the number of cycles chosen for the sinusoidal reference signal used by the matched filter may be selected as any number of cycles that match the number of cycles used by a ultra spectral modulator when encoding each binary symbol in a message signal within a given pulse-width.

Referring back to FIG. 17, the phase of the output signal generated by correlator 1705 is detected by phase detector 1710, and the detected phase is then used with the output signal generated by correlator 1705 in data bit decision block 1715 to recover the binary symbols encoded in the transmitted signal, i.e., to recover the message signal. Data bit decision block 1715 may be implemented with any well-known data bit decision circuitry to one skilled in the art, including with a Costas decision loop.

Figure 19:
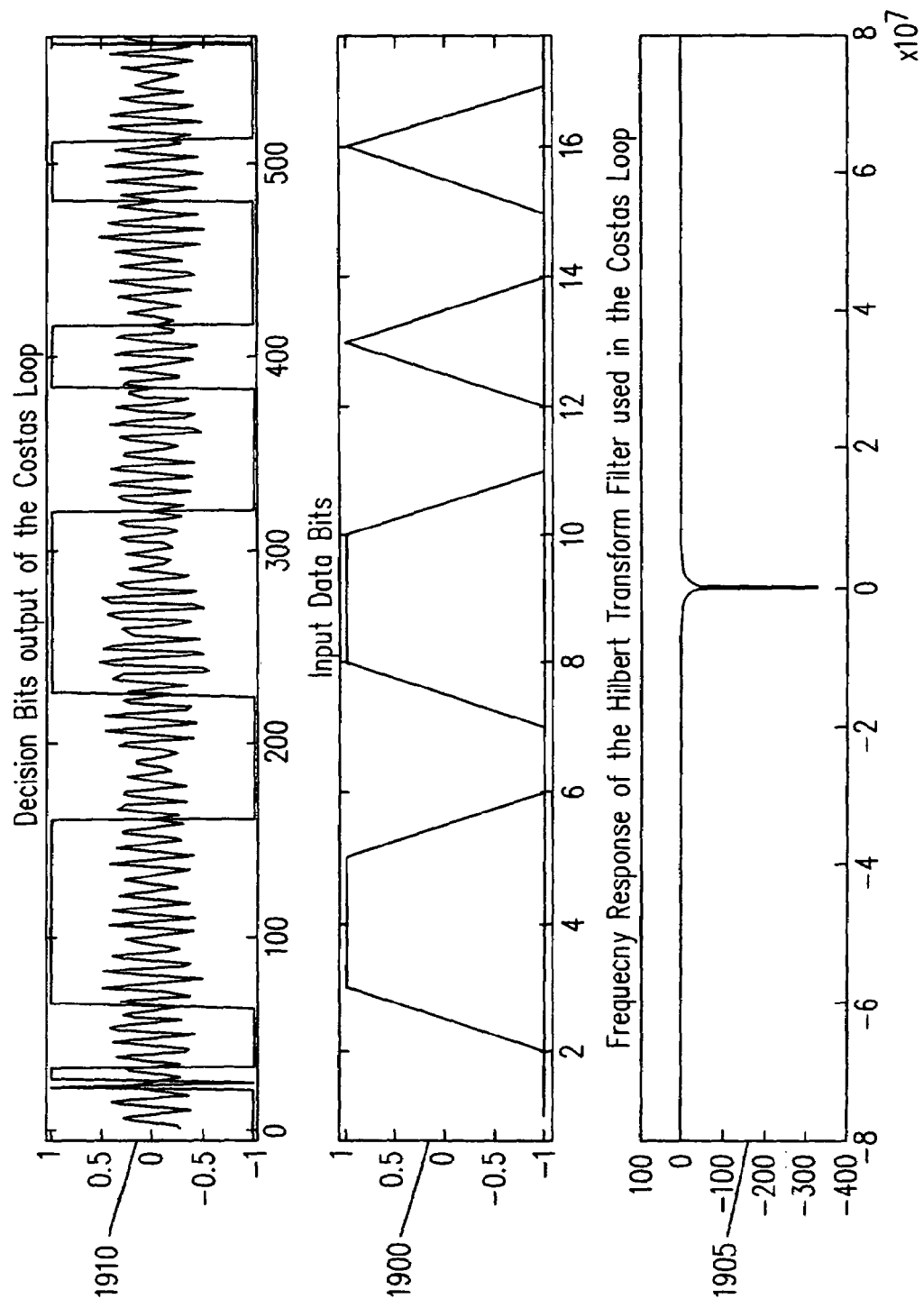
FIG. 19 are exemplary plots of signals generated by a second order Costas decision loop for use in a communications receiver system according to the principles and embodiments of the present invention.

Referring now to FIG. 19, exemplary plots of signals generated by a second order Costas decision loop for use in a communications receiver system according to the principles and embodiments of the present invention is described. Plot 1900 shows the message signal transmitted with a communications transmitter system of the present invention, such as communications transmitter system 1300 shown in FIG. 13 and communications transmitter system 1400 shown in FIG. 14. Plot 1905 shows the frequency response of a Hilbert transform filter used in the Costas loop, and plot 1910 shows the output signal generated by the Costas loop superimposed with the message signal recovered by the Costas loop.

As illustrated, the binary symbols of the message signal plotted in plot 1900 were correctly recovered by the Costas loop in the output signal plotted in plot 1910. The exemplary Costas loop used to recover the binary symbols was designed with the following Costas loop parameters: K1=0.1, A=0.16665/4; B=0.01389/16; and F=center frequency of the transmit filter selected according to equation (3) above. It should be understood by one skilled in the art that other parameters may be used in a Costas loop for recovering message signals transmitted and received according to the principles and embodiments of the present invention.

VII. Fractal-Based Spectral Estimator Receiver Approach

Figure 20:
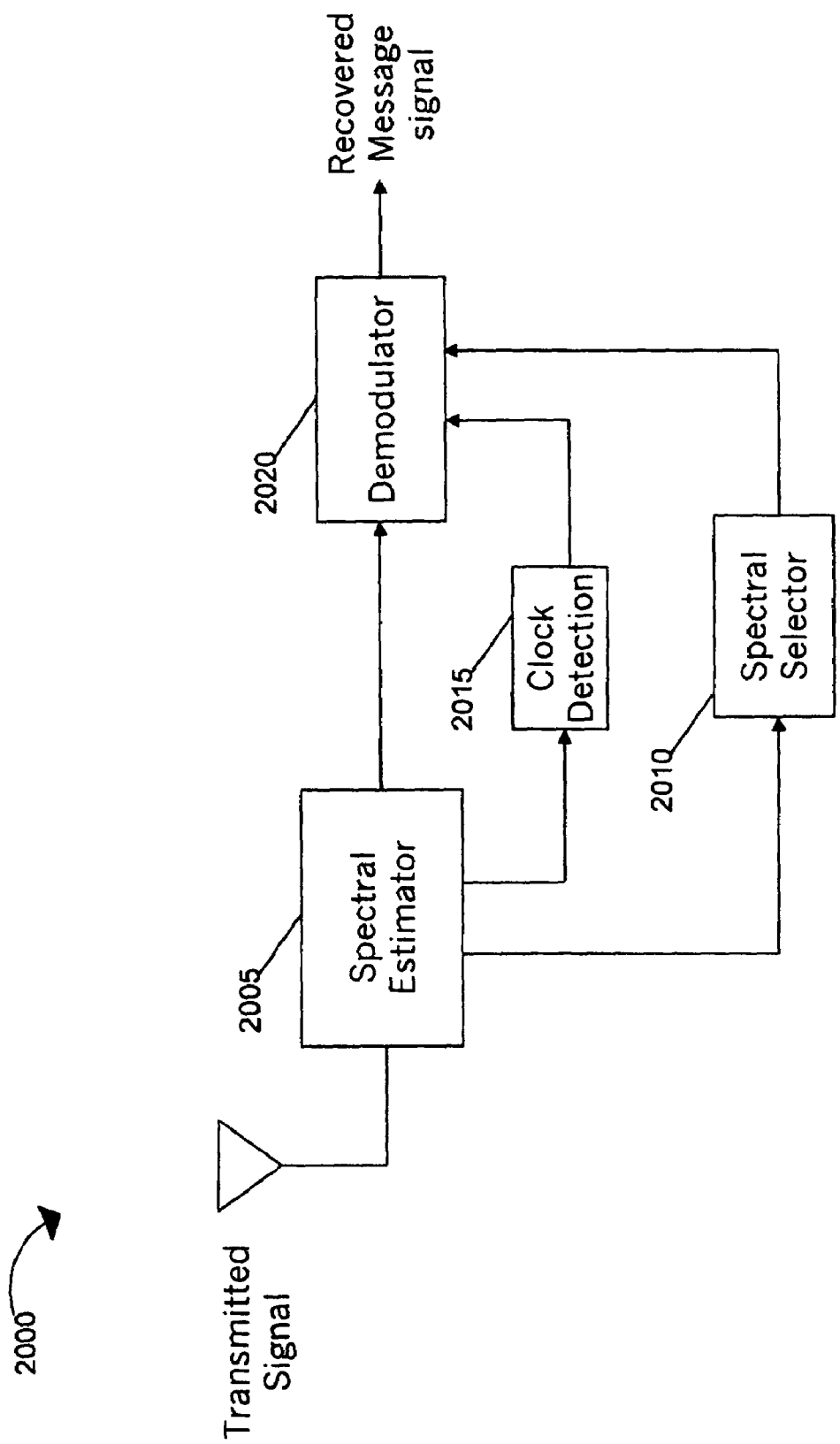
FIG. 20 is an exemplary schematic diagram of a communications receiver system using the fractal-based spectral estimator receiver approach to recover message signals transmitted through a communications channel according to the principles and embodiments of the present invention.

Referring now to FIG. 20, an exemplary schematic diagram of a communications receiver system using the fractal-based spectral estimator receiver approach to recover message signals transmitted through a communications channel according to the principles and embodiments of the present invention is described. Communications receiver system 2000 may be used to recover a message signal transmitted according to the principles and embodiments of the present invention by using spectral estimator 2005 to estimate the frequency spectrum of the transmitted signal.

Once the frequency spectrum of the transmitted signal is generated by spectral estimator 2005, spectral selector 2010 is used to extract the transmitted signal at the desired frequencies, i.e., at the transmitted frequencies within the narrowband selected for the transmission filter bandwidth according to equation (2) above. The message signal is then recovered by demodulator 2020 taking as inputs a phase-locked receiver clock generated by clock detection circuitry 2015 and the transmitted signals recovered by spectral selector 2010.

It should be understood by one skilled in the art that traditional spectral estimation, spectral selection, and demodulation circuitry may be used by communications receiver system 2000. For example, demodulator 2020 may be implemented with the correlator, phase detector, and data bit decision circuitry of demodulator 1515 shown in FIG. 15 and described above with reference to FIG. 17.

VIII. Communications Systems

It should also be understood by one skilled in the art that communication systems designed according to the principles and embodiments of the present invention may be implemented using any combination of the communication transmitter and receiver systems shown in FIGS. 13-14, 15, and 20.

Figure 21:
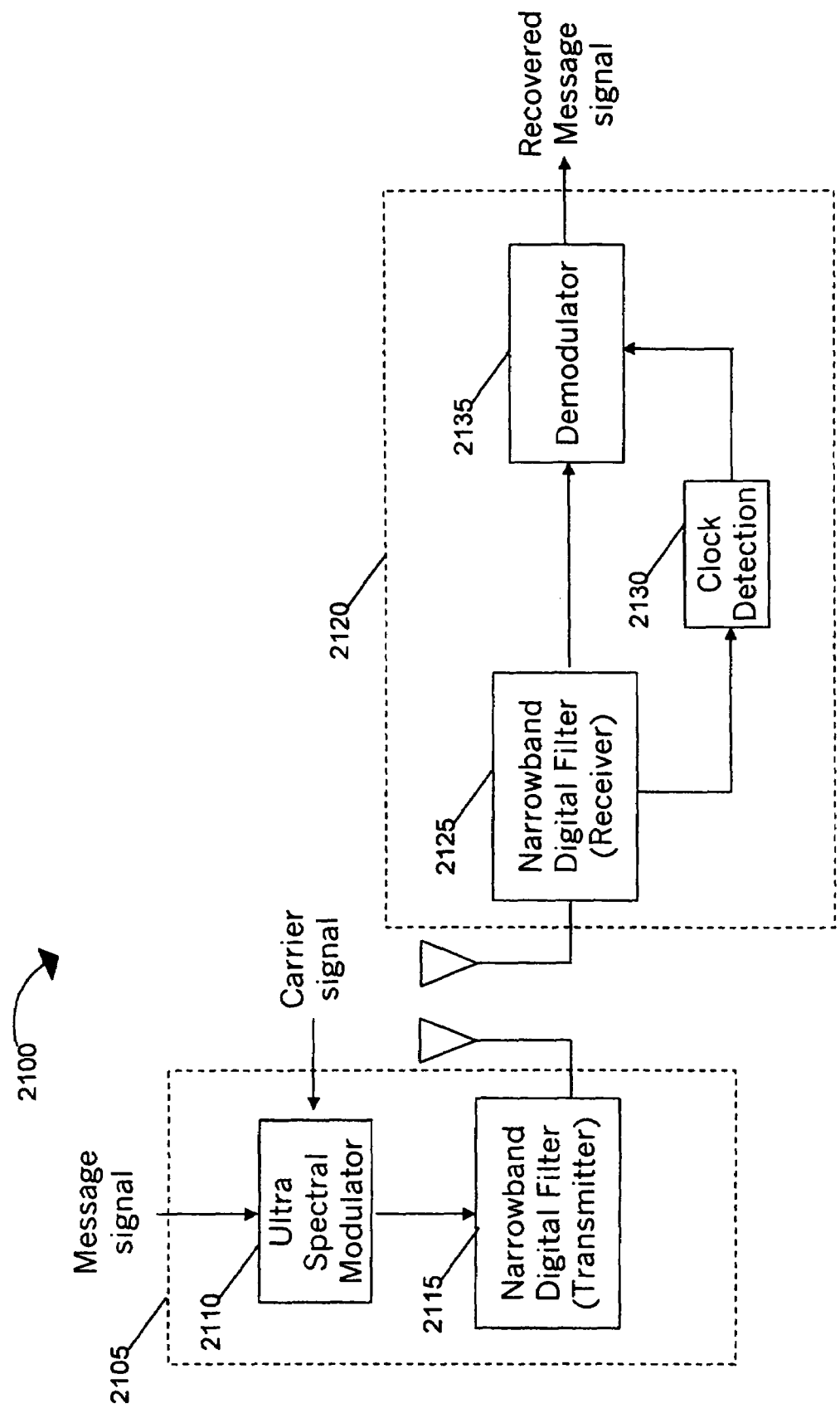
FIG. 21 is an exemplary embodiment of a communications system designed according to the principles of the present invention.

Referring now to FIG. 21, an exemplary embodiment of a communications system designed according to the principles of the present invention is described. Communications system 2100 is implemented with communications transmitter system 2105 and communications receiver system 2120. Communications transmitter system 2105 is a transmitter system designed using the fractal-based transmitter filtering approach as described hereinabove with reference to FIG. 13. Communications receiver system 2120 is a receiver system designed using the fractal-based receiver filtering approach as described hereinabove with reference to FIG. 15.

Figure 22:
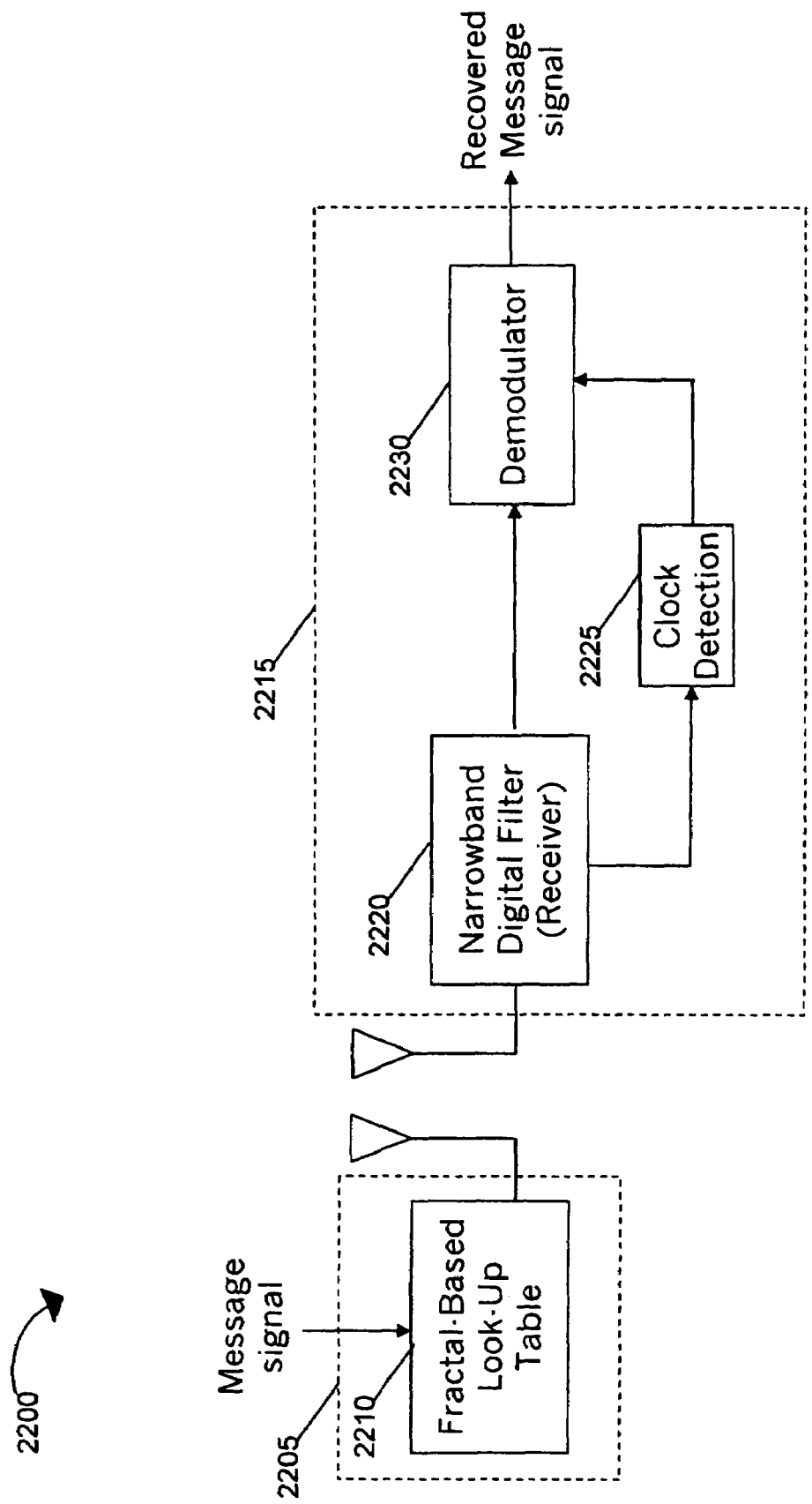
FIG. 22 is another exemplary embodiment of a communications system designed according to the principles of the present invention.

Referring now to FIG. 22, another exemplary embodiment of a communications system designed according to the principles of the present invention is described. Communications system 2200 is implemented with communications transmitter system 2205 and communications receiver system 2215. Communications transmitter system 2205 is a transmitter system designed using the fractal-based look-up table transmitter approach as described hereinabove with reference to FIG. 14. Communications receiver system 2215 is a receiver system designed using the fractal-based receiver filtering approach as described hereinabove with reference to FIG. 15.

Figure 23:
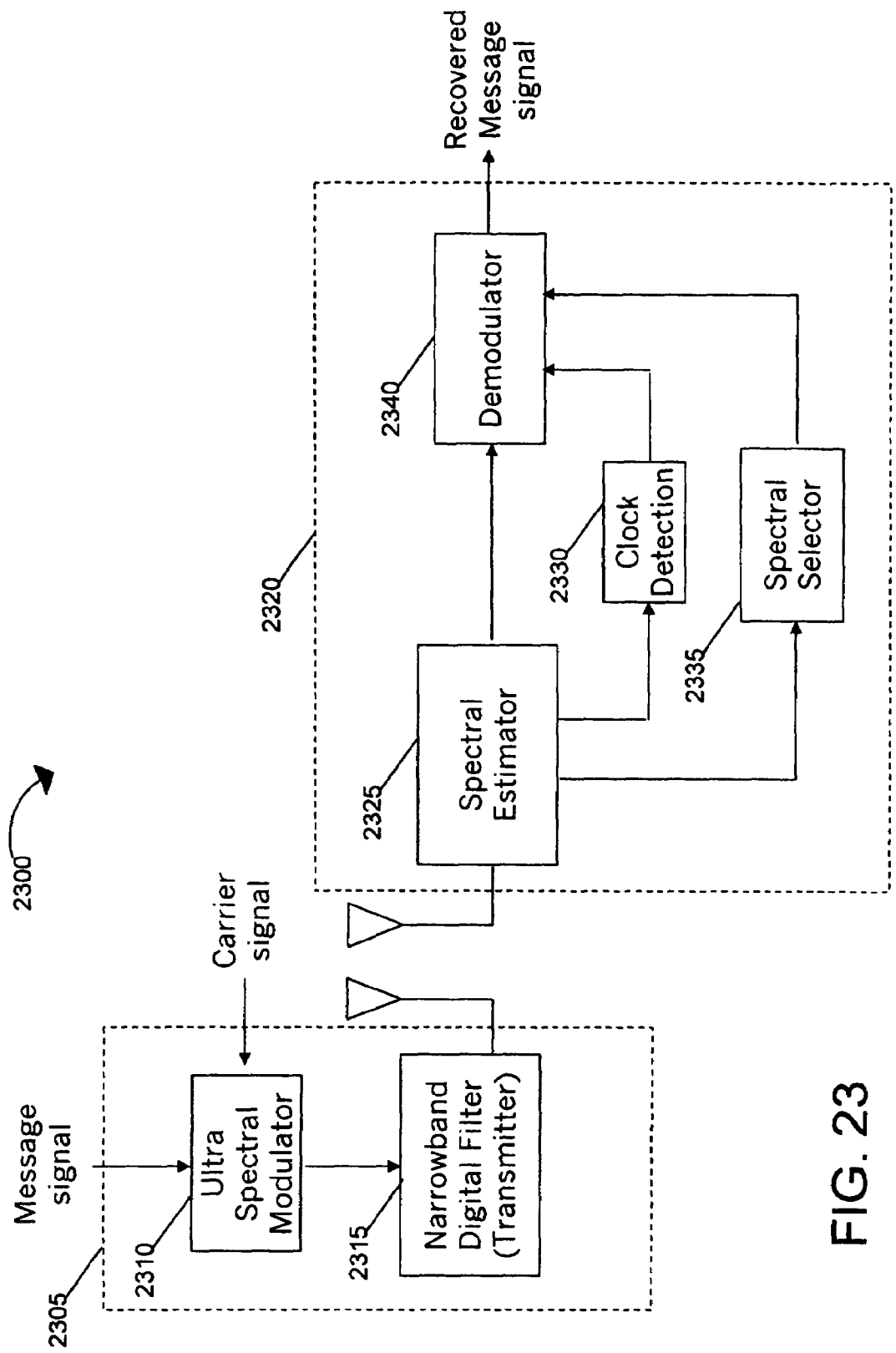
FIG. 23 is another exemplary embodiment of a communications system designed according to the principles of the present invention.

Referring now to FIG. 23, another exemplary embodiment of a communications system designed according to the principles of the present invention is described. Communications system 2300 is implemented with communications transmitter system 2305 and communications receiver system 2320. Communications transmitter system 2305 is a transmitter system designed using the fractal-based transmitter filtering approach as described hereinabove with reference to FIG. 13. Communications receiver system 2320 is a receiver system designed using the fractal-based spectral estimator receiver approach as described hereinabove with reference to FIG. 20.

Figure 24:
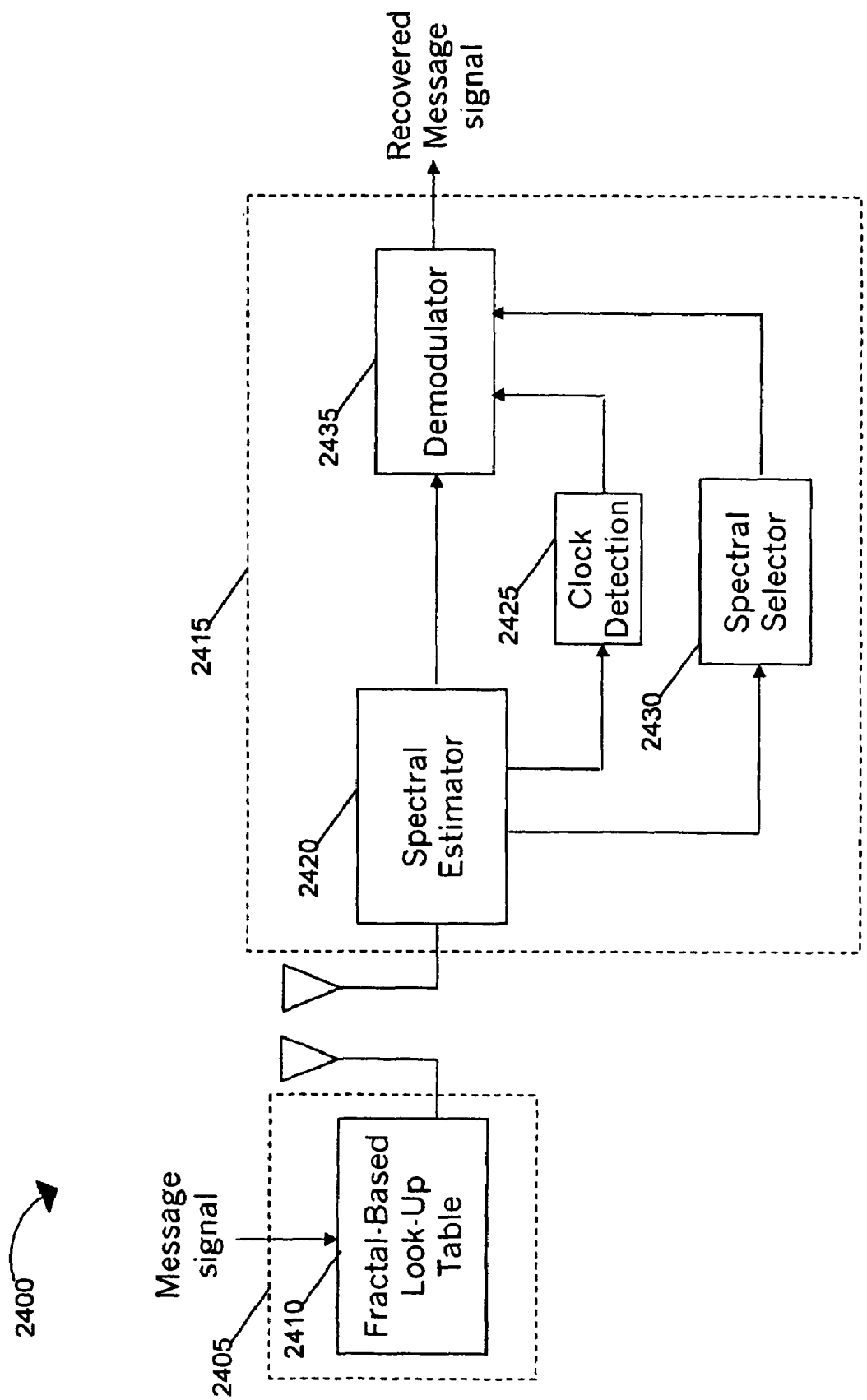
FIG. 24 is yet another exemplary embodiment of a communications system designed according to the principles of the present invention.

Referring now to FIG. 24, yet another exemplary embodiment of a communications system designed according to the principles of the present invention is described. Communications system 2400 is implemented with communications transmitter system 2405 and communications receiver system 2415. Communications transmitter system 2405 is a transmitter system designed using the fractal-based look-up table transmitter approach as described hereinabove with reference to FIG. 14. Communications receiver system 2405 is a receiver system designed using the fractal-based spectral estimator receiver approach as described hereinabove with reference to FIG. 20.

It should be understood by one skilled in the art that the communications systems of FIGS. 21-24 may operate in a standalone wireless network or be integrated into existing wireless standards and systems at very low overhead costs. In addition, the communications systems of FIGS. 21-24 may be used in a variety of communications applications, including in satellite systems with polarized transmitter and receiver antennas.

Further, it should be understood by one skilled in the art that although the systems and methods of the present invention were described with reference to wireless communications, they may also be used in wired communications to achieve broadband-like wired services within a very narrow frequency spectrum.

IX. Satellite Communications System

Figure 25:
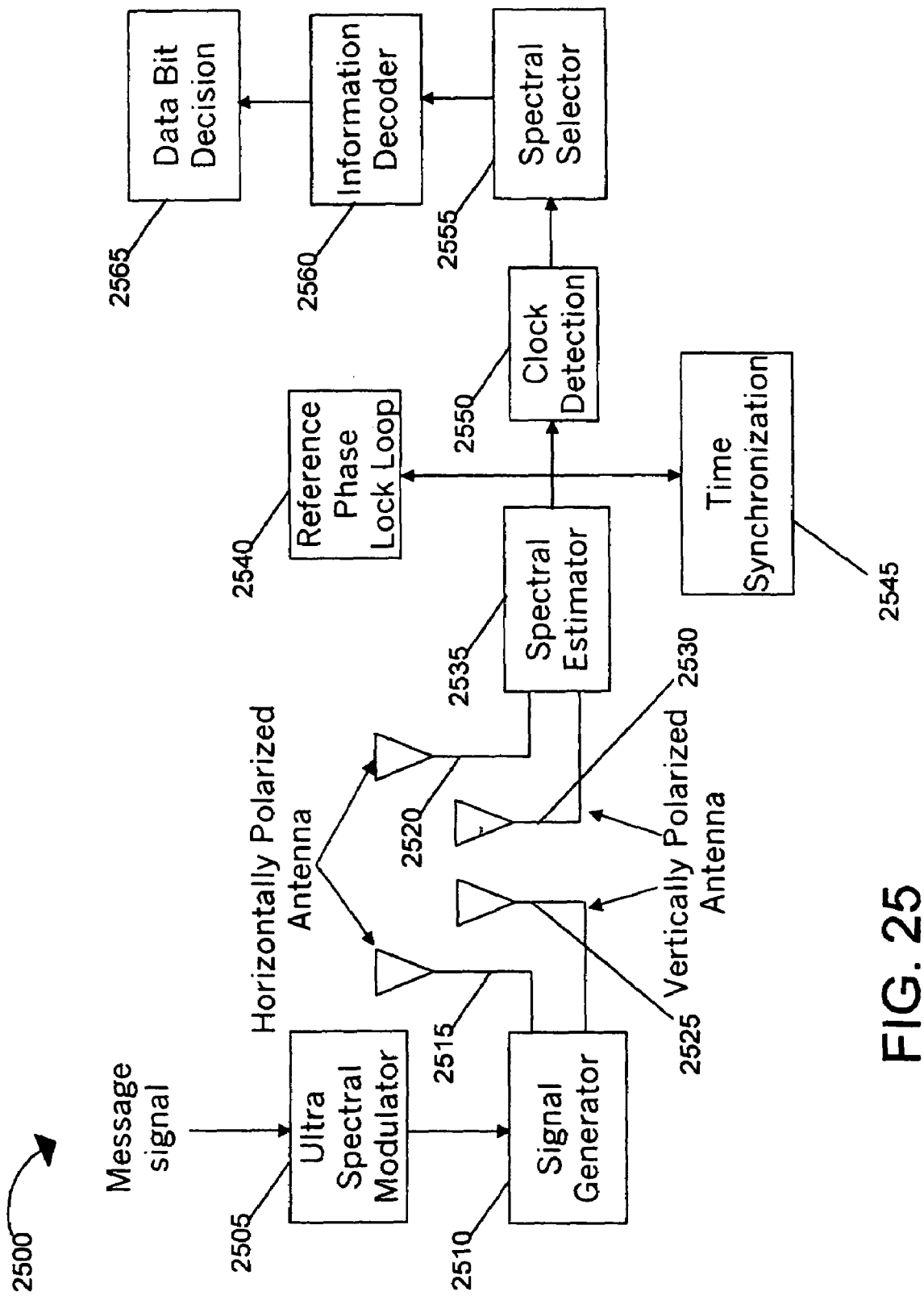
FIG. 25 is an exemplary embodiment of a satellite communications system designed according to the principles of the present invention.

Referring now to FIG. 25, an exemplary embodiment of a satellite communications system designed according to the principles of the present invention is described. Satellite communications system 2500 may be used in the transmission of signals modulated with the USM technique of the present invention. A message signal is first modulated by USM modulator 2505, using either the fractal-based transmitter filtering approach or the fractal-based look-up table transmitter approach, and adapted for transmission over horizontally polarized antenna 2515 and vertically polarized antenna 2525 by signal generator block 2510.

The transmitted signal is received at horizontally polarized antenna 2520 and vertically polarized antenna 2530. The message signal is recovered by spectral estimator 2535, reference phase lock loop 2540, time synchronization block 2545, clock detection 2550, spectral selector 2555, information decoder 2560, and data bit decision block 2565.

Figure 26:
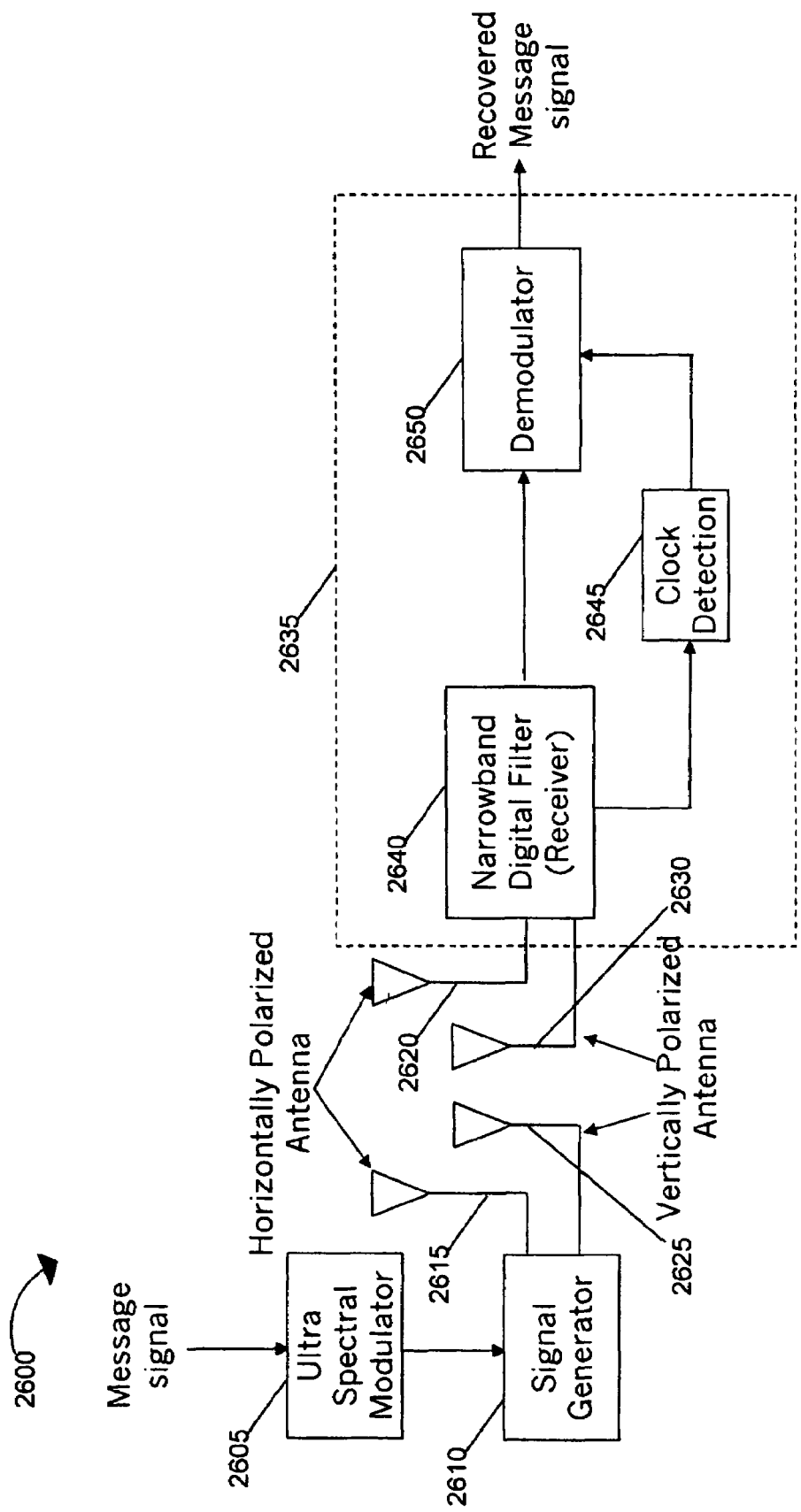
FIG. 26 is yet another exemplary embodiment of a satellite communications system designed according to the principles of the present invention.

Referring now to FIG. 26, yet another exemplary embodiment of a satellite communications system designed according to the principles of the present invention is described. Satellite communications system 2600 may be used in the transmission of signals modulated with the USM technique of the present invention. A message signal is first modulated by USM modulator 2605, using either the fractal-based transmitter filtering approach or the fractal-based look-up table transmitter approach, and adapted for transmission over horizontally polarized antenna 2615 and vertically polarized antenna 2625 by signal generator block 2610.

The transmitted signal is received at horizontally polarized antenna 2620 and vertically polarized antenna 2630. Communications receiver system 2635 is a receiver system designed using the fractal-based receiver filtering approach as described hereinabove with reference to FIG. 15.

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Steps of the described processes may be reordered or combined, and other steps may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents.

What is claimed is:

1. A narrowband digital filter for filtering information through a communications channel, the narrowband digital filter comprising:

a filter bandwidth BWF selected according to:

$$BWF = \text{DataRate}/2^{N-2}$$

wherein DataRate is a desired data rate for transmission and N is a fractal bifurcation index, wherein the fractal bifurcation index is selected by modeling a modulated signal with a set of fractal bifurcations, the modulated signal generated by a modulator when modulating a carrier signal at a carrier frequency $F_C$ with a message signal; and a center frequency $F_F$ selected according to:

$$F_F = F_C \pm (2^N - K)(\text{DataRate}/2^{N-1})$$

wherein $K = 2M - 1$, $M = 1:(2^{N-1})$, and $N \neq 0$.

2. The narrowband digital filter of claim 1, wherein the modulator comprises an encoder for encoding a first binary symbol into a first portion of the carrier signal, the first portion of the carrier signal having an integer number n of cycles and at a first phase, followed by a second portion of the carrier signal, the second portion of the carrier signal having an integer number n of cycles and at a second phase, wherein the second phase is at a phase shift away from the first phase.

3. The narrowband digital filter of claim 2, further comprising encoding a second binary symbol into a third portion of the carrier signal, the third portion of the carrier signal having an integer number n of cycles and at the second phase, followed by a fourth portion of the carrier signal, the fourth portion of the carrier signal having an integer number n of cycles and at the first phase.

4. The narrowband digital filter of claim 1, wherein the narrowband digital filter comprises a linear-phase filter.

5. The narrowband digital filter of claim 1, wherein the narrowband digital filter comprises a uniform stopband attenuation of at least 60 dB.

6. The narrowband digital filter of claim 1, wherein the narrowband digital filter comprises a passband ripple of no more than 0.1 dB.

7. The narrowband digital filter of claim 1, wherein a capacity C of a communications systems using the narrowband digital filter is given by:

$$C = 2^{N-2}$$

8. The narrowband digital filter of claim 1, wherein DataRate is greater than 5 Mbps.

\* \* \* \* \*